(12) United States Patent
Kaji et al.

(10) Patent No.: US 11,194,225 B2
(45) Date of Patent: Dec. 7, 2021

(54) LAMINATE FOR NON-LINEAR OPTICS CONTAINING ELECTRO-OPTIC POLYMER LAYER AND METHOD FOR PRODUCING SAME

(71) Applicant: National Institute of Information and Communications Technology, Tokyo (JP)

(72) Inventors: Takahiro Kaji, Koganei (JP); Yukihiro Tominari, Koganei (JP); Toshiki Yamada, Koganei (JP); Akira Otomo, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 0 days.

(21) Appl. No.: 16/641,015

(22) PCT Filed: Aug. 23, 2018

(86) PCT No.: PCT/JP2018/031089
§ 371 (c)(1),
(2) Date: Feb. 21, 2020

(87) PCT Pub. No.: WO2019/039530
PCT Pub. Date: Feb. 28, 2019

(65) Prior Publication Data
US 2021/0026221 A1   Jan. 28, 2021

(30) Foreign Application Priority Data
Aug. 24, 2017 (JP) .............................. JP2017-161292

(51) Int. Cl.
*G02F 1/361* (2006.01)
*G02F 1/365* (2006.01)
*H01S 3/00* (2006.01)

(52) U.S. Cl.
CPC ............ *G02F 1/3615* (2013.01); *G02F 1/365* (2013.01); *H01S 3/0092* (2013.01)

(58) Field of Classification Search
CPC ......... G02F 1/3615–3617; G02F 1/365; G02F 1/377; G02F 1/3775
See application file for complete search history.

(56) References Cited

U.S. PATENT DOCUMENTS 5,224,196 A * 6/1993 Khanarian ............ G02F 1/3617
                                                            252/582
6,067,186 A   5/2000 Dalton et al.
(Continued)

FOREIGN PATENT DOCUMENTS

EP     413903 A1 *  5/1990  .............. G02B 6/12
EP    3121202 A1    1/2017
(Continued)

OTHER PUBLICATIONS

Vallejo et al., "Simplified model for optical rectification of broadband terahertz pulses in lossy waveguides including a new generalized expression for the coherence length," Optics Express, 21 (20): 24398-24412 (2013).
(Continued)

*Primary Examiner* — Rhonda S Peace
(74) *Attorney, Agent, or Firm* — Morgan, Lewis & Bockius LLP

(57) ABSTRACT

The present disclosure provides a method for producing a laminate for non-linear optics.

20 Claims, 15 Drawing Sheets

(56) References Cited

U.S. PATENT DOCUMENTS

| | | |
|---|---|---|
| 8,615,147 B2 | 12/2013 | Han et al. |
| 8,846,955 B2 | 9/2014 | Otomo et al. |
| 9,488,755 B2 | 11/2016 | Otomo et al. |
| 9,594,189 B2 | 3/2017 | Yokoyama et al. |
| 9,977,150 B2 | 5/2018 | Otomo et al. |
| 10,253,124 B2 * | 4/2019 | Otomo ............ G02F 1/3617 |
| 2011/0091149 A1 | 4/2011 | Jen et al. |
| 2012/0020614 A1 | 1/2012 | Han et al. |
| 2012/0172599 A1 | 7/2012 | Otomo et al. |
| 2014/0199038 A1 | 7/2014 | Yokoyama et al. |
| 2015/0048284 A1 | 2/2015 | Otomo et al. |
| 2016/0318889 A1 | 11/2016 | Otomo et al. |
| 2018/0224577 A1 | 8/2018 | Otomo et al. |

FOREIGN PATENT DOCUMENTS

| | | | |
|---|---|---|---|
| JP | H08-071777 A | 3/1996 | |
| JP | 2004-501159 A | 1/2004 | |
| JP | 2006-506689 A | 2/2006 | |
| JP | 2012-027437 A | 2/2012 | |
| JP | 2013-025261 A | 2/2013 | |
| JP | 2014-044272 A | 3/2014 | |
| JP | 2014-44272 A | 3/2014 | |
| JP | 2014044272 * | 3/2014 | ............ G02F 1/355 |
| JP | 2016-130768 A | 7/2016 | |
| WO | 01/98310 A1 | 12/2001 | |
| WO | 2004/046797 A1 | 6/2004 | |
| WO | 2011/024774 A1 | 3/2011 | |
| WO | 2013/024840 A1 | 2/2013 | |
| WO | WO-2015141650 A1 * | 9/2015 | ........... C08G 18/728 |

OTHER PUBLICATIONS

Organic Materials for Nonlinear Optics, edited by The Chemical Society of Japan, quarterly Chemical Review, No. 15 (1992) (partial translation).

Bosshard et al., Organic Nonlinear Optical Materials, Gordon and Breach Publishers, Advanced in Nonlinear Optics, vol. 1, pp. 9, 12, 28-30, 141-144, 146-149, 154-161, 164-167, and 170-171 (partial translation).

Kaino, Recent Advance on Photonic Organic Materials for Information and Telecommunication Applications, published by CMC, "Telecommunication Application," p. 67 (partial translation).

Molecular Nonlinear Optics, Materials, Physics, and Devices, edited by Joseph Zyss, pp. 135, 137, 148, 150, 156-517, 252, 328, 386, 388, 392, 393, and 394.

Yamada et al., "Transmission ellipsometic method without an aperture for simple and reliable evaluation of electro-optic properties," Optics Express, 21 (24): 29240-29248 (2013).

Larry et al., Organic Electro-Optics and Photonics, Molecules, Polymers, and Crystals, pp. 49-51, 55, 57, 59, 61, 72, 89, 92-95, 104, 105, 122, 123, 127, 130, 133, 134, 140, 142, 153, 164, 165, 166-168, and 234-238.

Vallejo et al., "Design of ultra-broadband terahertz polymer waveguide emitters for telecom wavelengths using coupled mode theory," Optics Express, 21 (5): 5842-5858 (2013).

International Search Report issued in corresponding International Patent Application No. PCT/JP2018/031089 dated Nov. 13, 2018.

Extended European Search Report dated Mar. 17, 2021, issued in corresponding EP Application No. 18848353.1-1209.

Y. Enami et al., Low half-wave voltage and high electro-optic effect in hybrid polymer/sol-gel waveguide modulators; Appl. Phys. Lett. 89, 143506, pp. 1-3 (2006); https://doi.org/10.1063/1.2354440.

Y. Enami et al., Short hybrid polymer/sol-gel silica waveguide switches with high in-device electro-optic coefficient based on photostable chromophore; AIP Advances 1, 042137, pp. 1-7 (2011); https://doi.org/10.1063/1.3662038.

Y. Enami et al., Hybrid polymer/sol-gel waveguide modulators with exceptionally large electro-optic coefficients; Nature Photonics 1, 180-185 (2007).

Y. Enami et al., Enhanced conductivity of sol-gel silica cladding for efficient poling in electro-optic polymer/TiO2 vertical slot waveguide modulators; Dec. 1, 2014, vol. 22, No. 24, pp. 30191-30199 DOI:10.1364/OE.22.030191, Optics Express.

Feng Qiu et al., A hybrid electro-optic polymer and TiO2 double-slot waveguide modulator; Scientific Reports | 5 : 8561, pp. 1-6 | DOI: 10.1038/srep08561 published Feb. 24, 2015, www.nature.com/scientificreports.

* cited by examiner (a)

(b)

(c)

(d)

(e)

(f)

(a)

(c)

(b)

(d)

(e)

(a)

(b)

(c)

(d)

(e)

(f)

(a)

(d)

(b)

(e)

(c)

(f)

(a)

(b)

(c)

(a)

(b)

(c)

(d)

(e)

(f)

(a)

(b)

(c)

(a)

(b)

(c)

LAMINATE FOR NON-LINEAR OPTICS CONTAINING ELECTRO-OPTIC POLYMER LAYER AND METHOD FOR PRODUCING SAME

TECHNICAL FIELD

The present invention relates to a laminate for non-linear optics containing an electro-optic polymer layer and a method for producing the same.

BACKGROUND ART

An electro-optic polymer has a larger electro-optic constant than that of inorganic non-linear optical materials such as lithium niobate and zinc telluride, and organic non-linear materials such as DAST (4-N,N-dimethylamino-4'-N'-methyl-stilbazolium tosylate). The electro-optic polymer can have a larger figure of merit for the generation of a terahertz wave considering the electro-optic constant and a refractive index ($n_{opt}^6 r^2/16 n_{THz}$; $n_{opt}$: refractive index of material at wavelength of incident light, r: electro-optic constant, $n_{THz}$: refractive index of material at wavelength of generated terahertz wave ("Organic Electro-Optics and Photonics" (L. R. Dalton, et. al., Cambridge University Press (2015))) than that of other material, whereby a highly efficient terahertz wave generating element (or detecting element) can be attained. A crystalline non-linear optical material has a large absorption coefficient due to crystal lattice vibration in a terahertz wave (0.1 to 20 THz) band, whereas the electro-optic polymer has a small absorption coefficient in a wide band of a terahertz wave band. Therefore, the electro-optic polymer can generate and detect a wide band terahertz wave. The electro-optic polymer has a small difference in refractive index between an optical region and each of a terahertz wave band, a microwave band, and a millimeter wave band. Therefore, a non-linear optical element containing an electro-optic polymer (this non-linear optical element includes an electro-optic element) can cause electromagnetic waves having various frequencies to efficiently interact with each other. The non-linear optical element containing an electro-optic polymer (this non-linear optical element includes an electro-optic element) can perform efficient frequency conversion, and phase modulation of an electromagnetic wave, and the like. From such a viewpoint, the electro-optic polymer has been attracted attention as a material assuming next-generation optical communication, wireless communication, and electromagnetic wave sensing, and the like.

Examples of the types of the electro-optic polymer include (1) a guest-host type electro-optic polymer obtained by mixing a polymer (hereinafter, may be referred to as "matrix polymer") serving as a matrix with a compound exhibiting a second-order non-linear optical effect (hereinafter, may be referred to as "electro-optic molecules"), (2) a side chain type electro-optic polymer containing electro-optic molecules covalently bonded to a side chain of a basic skeleton polymer (hereinafter, may be referred to as "base polymer"), (3) a main chain type electro-optic polymer in which electro-optic molecules are covalently bonded in a main chain of a base polymer, (4) a cross-link type electro-optic polymer containing cross-linkage between matrix polymers or base polymers, or between a matrix polymer or a base polymer and electro-optic molecules, and the like, and (5) a molecular glass type electro-optic polymer. The electro-optic polymer has been known as a high performance second-order non-linear optical material. The electro-optic polymer exhibits a second-order non-linear optical effect.

The second-order non-linear optical effect includes second-order harmonic generation, optical rectification, sum frequency generation, difference frequency generation, optical parametric oscillation/amplification, and an electro-optic effect (Pockels effect), and the like. By such a second-order non-linear optical effect, frequency (wavelength) conversion of electromagnetic waves having various frequencies, and control of the phase of an electromagnetic wave in an electric field, and the like are achieved in a non-linear optical element containing an electro-optic polymer. As a specific example, a terahertz wave (concept including an electromagnetic wave having a frequency of 0.1 to 20 THz, such as a microwave, a millimeter wave, or infrared light) can be generated by frequency conversion of a laser beam including two or more frequencies by a second-order non-linear optical effect. The laser beam containing one or more frequencies and the terahertz wave are subjected to frequency conversion by the second-order non-linear optical effect, whereby the frequency of the laser beam is changed, and the terahertz wave can be detected by detecting the laser beam having changed frequencies. The terahertz wave and the electric field can be detected by using the change in the refractive index due to the electro-optic effect. The phase modulation of the electromagnetic wave can be performed by using the change in the refractive index due to the electro-optic effect.

In order that the electro-optic polymer exhibits the second-order non-linear optical effect, it is necessary to align (orient) the electro-optic molecules contained in the electro-optic polymer in the same direction as much as possible. The processing is referred to as poling processing. Examples of a method for performing poling processing include a method in which poling electrodes are disposed above and below an electro-optic polymer film or an electro-optic polymer waveguide and a voltage is applied between the electrodes, or a method in which two or more poling electrodes or comb type poling electrodes and the like are disposed above and below an electro-optic polymer film or an electro-optic polymer waveguide, and a voltage is applied between the electrodes. The electric field during the poling processing using the poling electrodes is typically 100 V/μm. There is a method in which poling processing is performed by subjecting an electro-optic polymer film to corona discharge. The electro-optic polymer film can be easily formed by a spin coating method or the like. The formed electro-optic polymer film can be processed into a waveguide by using a fine processing process such as photolithography or dry etching.

In a conventional method for producing a non-linear optical element containing an electro-optic polymer, the construction of the non-linear optical element as a final element structure is constructed, and the electro-optic polymer as one of constituent elements is subjected to poling processing. For example, in a conventional technique for producing a waveguide containing an electro-optic polymer, a lower poling electrode is first formed on a substrate, and a clad layer, a core layer containing an electro-optic polymer, and a clad layer are formed in this order on the lower poling electrode. Furthermore, an upper poling electrode is formed on the clad layer. Thereafter, by applying a voltage between the two poling electrodes, the electro-optic polymer has been subjected to poling processing (National Patent Publication No. 2006-506689 (PTL 1), Japanese Patent Laying-Open No. 2012-027437 (PTL 2), Japanese Patent Laying-Open No. 2013-025261 (PTL 3), Japanese Patent Laying-Open No. 2016-130768 (PTL 4), and International Publication No. 2013/024840 (PTL 5)).

CITATION LIST

Patent Literature

PTL 1: National Patent Publication No. 2006-506689
PTL 2: Japanese Patent Laying-Open No. 2012-027437
PTL 3: Japanese Patent Laying-Open No. 2013-025261
PTL 4: Japanese Patent Laying-Open No. 2016-130768
PTL 5: International Publication No. 2013/024840

Non Patent Literature

NPL 1: F. A. Vallejo, L. M. Hayden, "Simplified model for optical rectification of broadband terahertz pulses in lossy waveguides including a new generalized expression for the coherence length,", Opt. Express, vol. 21, 24398-24412 (2013)

SUMMARY OF INVENTION

Technical Problem

However, depending on the configuration of the non-linear optical element to be produced, the poling processing cannot be sufficiently performed to thereby cause a problem that the orientation of the electro-optic molecules in the electro-optic polymer is not sufficient, or the configuration of the non-linear optical element is made suitable for the poling processing to thereby cause a problem that the finally produced non-linear optical element does not have a predetermined performance.

The present invention has been made in view of the situation. It is an object of the present invention to provide a method for producing a laminate for non-linear optics that is not limited by the condition of poling processing.

Solution to Problem

As a result of extensive research, the present inventors found that the problem can be solved by subjecting an electro-optic polymer layer containing electro-optic molecules to poling processing, and thereafter laminating the electro-optic polymer layer on a predetermined supporting body, and completed the present invention. That is, the present application provides the following embodiments.
[1] A method for producing a laminate for non-linear optics, the method including:
 a step of subjecting an electro-optic polymer layer containing an electro-optic molecule to poling processing; and
 a step of laminating the electro-optic polymer layer subjected to the poling processing on a supporting body.
[2] The method according to [1], wherein the step of laminating is performed by bonding a surface of the electro-optic polymer layer and a surface of the supporting body through a covalent bond, an electrostatic interaction, or a van der Waals interaction.
[3] A laminate for non-linear optics including:
 a supporting body; and
 an electro-optic polymer layer laminated on the supporting body with being in contact with the supporting body,
wherein
 the electro-optic polymer layer contains an electro-optic molecule, and
 the electro-optic molecule in the electro-optic polymer layer is oriented in a predetermined direction.
[4] The laminate for non-linear optics according to [3], wherein an adhesive strength between the supporting body and the electro-optic polymer layer is greater than or equal to 0.01 N/mm$^2$ and less than or equal to 20 N/mm$^2$.
[5] A waveguide element for terahertz wave, including the laminate for non-linear optics according to [3] or [4], wherein the supporting body contains a cycloolefin polymer or a cycloolefin copolymer.
[6] A non-linear optical element for high-power laser, including the laminate for non-linear optics according to [3] or [4], wherein the electro-optic polymer layer has a thickness of greater than or equal to 5 µm and less than or equal to 50 cm.
[7] A light modulation element including the laminate for non-linear optics according to [3] or [4], wherein the supporting body contains at least one selected from the group consisting of glass, $SiO_2$, sol-gel glass, a fluororesin, polycarbonate, a (meth)acrylate polymer, a cycloolefin polymer, a cycloolefin copolymer, polystyrene, polyethylene, polymethylpentene, polypropylene, polyimide, polyvinyl alcohol, polyethylene terephthalate, an ultraviolet curable resin, silicon, gallium arsenide, indium phosphide, titanium oxide, zinc oxide, aluminum oxide, silicon nitride, aluminum nitride, ITO, IZO, and IGZO.
[8] A free-standing electro-optic polymer laminate including the laminate for non-linear optics according to [3] or [4], wherein the supporting body is an electro-optic polymer having same composition as or different composition from composition of the electro-optic polymer layer.

Advantageous Effect of Invention

The present invention can provide a method for producing a laminate for non-linear optics that is not limited by the condition of poling processing.

DESCRIPTION OF EMBODIMENTS

Figure 1:
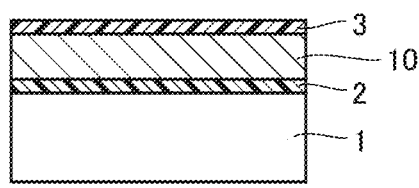
FIG. 1 is a schematic view showing an example of a method for producing a laminate for non-linear optics and a waveguide including the laminate.
Figure 1:
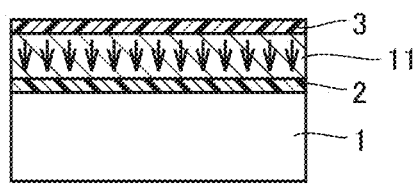
Figure 1:
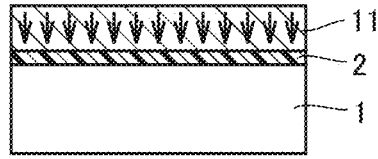
Figure 1:
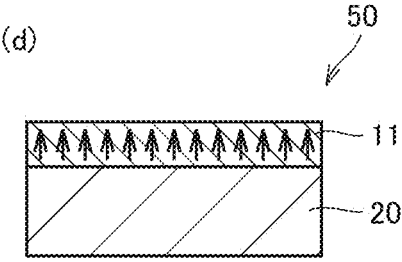
Figure 1:
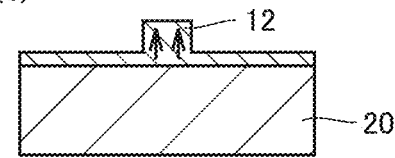
Figure 1:
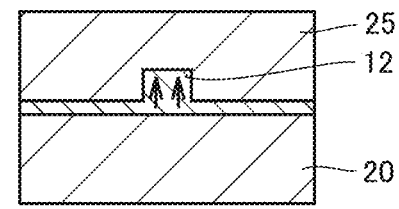

Hereinafter, an embodiment of the present invention will be described, but the present invention is not limited thereto.

(Method for Producing Laminate for Non-Linear Optics)

A method for producing a laminate for non-linear optics according to the present embodiment includes:

a step of subjecting an electro-optic polymer layer containing an electro-optic molecule to poling processing; and a step of laminating the electro-optic polymer layer subjected to the poling processing on a supporting body.

The producing method according to the present embodiment includes the above configuration, whereby a predetermined laminate for non-linear optics can be produced without being limited by the condition of the poling processing. In another aspect, the producing method according to the present embodiment can provide a method for producing an electro-optic polymer waveguide element using any material containing a material having a small terahertz wave absorption loss or a material having a small refractive index as a material of a clad layer around a core layer in the electro-optic polymer waveguide element, a method for producing a non-linear optical element containing an electro-optic polymer layer having any large film thickness, and a non-linear optical element containing the electro-optic polymer produced by the producing methods.

In the present embodiment, the "laminate for non-linear optics" is a laminate used for the production of a non-linear optical element and the like, and means a laminate including a supporting body and an electro-optic polymer layer.

In the present embodiment, the "electro-optic polymer" (hereinafter, may be referred to as "EO polymer") is a polymer that exhibits a second-order non-linear optical effect, and includes (1) a guest-host type electro-optic polymer obtained by mixing a matrix polymer with electro-optic molecules, (2) a side chain type electro-optic polymer containing electro-optic molecules covalently bonded to a side chain of a base polymer, (3) a main chain type electro-optic polymer containing electro-optic molecules covalently bonded in a main chain of a base polymer, (4) a cross-link type electro-optic polymer containing cross-linkage between matrix polymers or base polymers, or between a matrix polymer or a base polymer and electro-optic molecules, and the like, and (5) a molecular glass type electro-optic polymer. The guest-host type electro-optic polymer can also be grasped as a composition containing a matrix polymer and electro-optic molecules.

Examples of the second-order non-linear optical effect include second-order harmonic generation, optical rectification, sum frequency generation, difference frequency generation, optical parametric oscillation/amplification, and an electro-optic effect (Pockels effect).

In the present embodiment, the "matrix polymer" means a polymer that is a matrix of the electro-optic polymer. The matrix polymer includes an organic polymer that is a host of a guest-host type electro-optic polymer. The "base polymer" means a polymer that is a basic skeleton of an electro-optic polymer. The base polymer includes an organic polymer of a polymer main chain in a side chain type, main chain type, or cross-link type electro-optic polymer. As the matrix polymer and the base polymer, a transparent polymer without scattering is preferable for use as an optical material. Examples thereof include a (meth)acrylate-based polymer (for example, polymethyl methacrylate (PMMA)), polyamide, polyimide, polycarbonate (for example, poly[Bisphenol A carbonate-co-4,4'-(3,3,5-trimethylcyclo-hexylidene)diphenol carbonate] and the like), polydicyclopentanyl methacrylate (poly DCPMA), polyadamantyl methacrylate (poly AdMA), poly(DCPMA-co-MMA), poly(AdMA-co-MMA) and the like), a cycloolefin polymer, a cycloolefin copolymer, polystyrene, polyethylene, polymethylpentene, polypropylene, polyvinyl alcohol (PVA), polyethylene terephthalate, polysulfone, polyether sulfone, polyester, polyolefin, polyphenylene sulfide, polyurea, a silicon resin, an epoxy resin, and a fluororesin. The organic polymer may be used alone or in combination of two or more.

In the present embodiment, the "electro-optic molecules" mean a compound that exhibits a second-order non-linear optical effect. Examples of the electro-optic molecules include compounds that exhibit a second-order non-linear optical effect, described in U.S. Pat. No. 6,067,186, National Patent Publication No. 2004-501159, WO 2011/024774 A1, "Organic Materials for Nonlinear Optics" (edited by the Chemical Society of Japan, KIKAN KAGAKU SOSETSU No. 15 (1992), "Organic Nonlinear Optical Materials" (Ch. Bosshard, et. al., Gordon and Breach Publishers (1995)), "Recent Advance on Photonic Organic Materials for Information and Telecommunication Applications", supervised by Toshikuni Kaino, CMC Publishing CO., LTD. (2007), and "Molecular Nonlinear Optics" (ed. J. Zyss, Academic Press (1994)) and the like.

The electro-optic molecules are not particularly limited as long as the electro-optic molecules are the compounds that exhibit a second-order non-linear optical effect, but the electro-optic molecules are preferably compounds having a conjugated chemical structure and further having an electron-donating group and an electron-withdrawing group in their molecules. Here, examples of the conjugated chemical structure include aromatic compounds such as benzene, naphthalene, anthracene, perylene, biphenyl, indene and stilbene, heterocyclic compounds such as furan, pyran, pyrrole, imidazole, pyrazole, thiophene, thiazole, pyridine, pyridazine, pyrimidine, pyrazine, quinoline and coumarin, and compounds in which these compounds are bonded to each other through a carbon-carbon unsaturated bond or a nitrogen-nitrogen unsaturated bond.

Examples of the electron-donating group include an amino group, an alkoxy group, an allyloxy group, and a thioether group that may be substituted with an alkyl group, an aryl group, or an acyl group. Examples of the electron-withdrawing group include a nitro group, a cyano group, a dicyanovinyl group, a tricyanovinyl group, a halogen atom, a carbonyl group, a sulfone group, perfluoroalkyl, and tricyanovinylfuran, and tricyanofuran.

Examples of the electro-optic molecules include compounds represented by the following structural formulae [A-1] to [A-7]. These can be used alone or in combination of two or more.

[Chemical Formula 1]

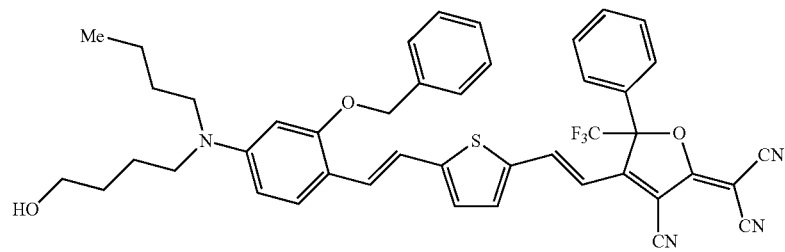

[A-1]

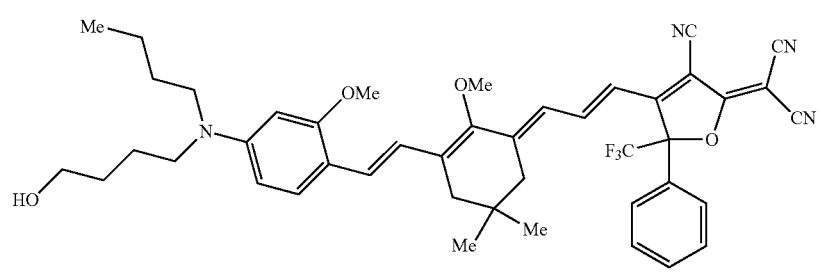

[A-2]

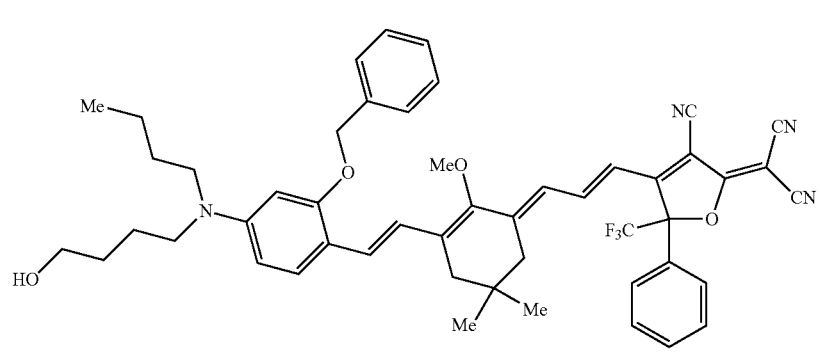

[A-3]

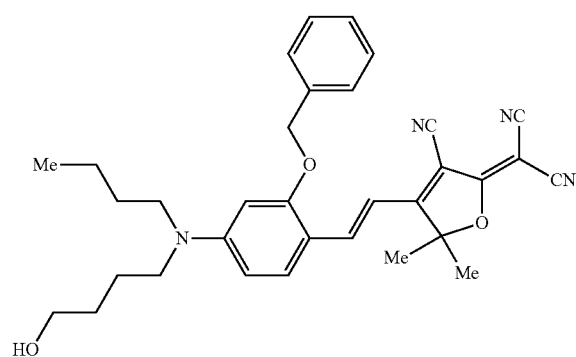

[A-4]

[Chemical Formula 2]

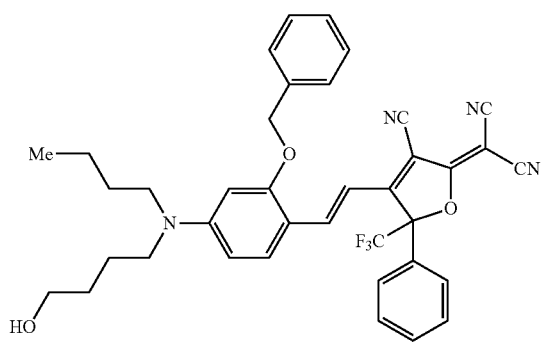
[A-5]

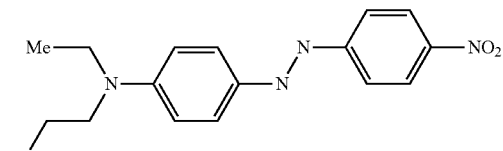
[A-6]

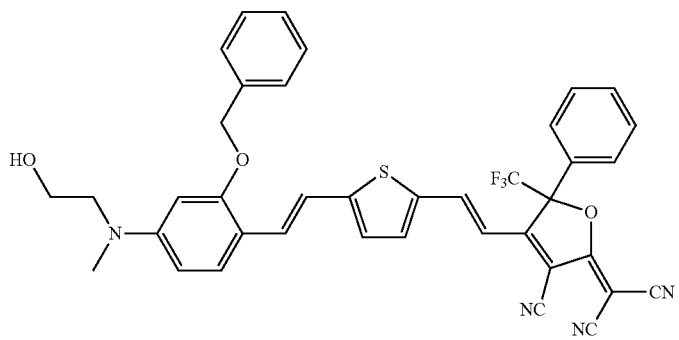
[A-7]

The content ratio of the electro-optic molecules is not particularly limited, but it is usually about 1 to 70% by mass with respect to the total amount of the matrix polymer or the base polymer and the electro-optic molecules (corresponding to the total mass of the electro-optic polymer), preferably about 5 to 60% by mass, and more preferably about 10 to 50% by mass. The content ratio is the same even when the electro-optic polymer is in a side chain type or main chain type form. Here, in the case of the side chain type electro-optic polymer, the content ratio of the electro-optic molecules is determined based on the electro-optic molecules derived from a side chain moiety. In the case of the main chain type electro-optic polymer, the content ratio of an electro-optic dye is determined based on an electro-optic molecular moiety in the main chain.

The electro-optic polymer may be, for example, a side chain type electro-optic polymer having repeating units represented by the formulae (1) to (3). In the formula, p, q and r each represent a positive integer. Here, the side chain type electro-optic polymer may be a copolymer of a repeating unit (for example, a repeating unit represented by the formula (1) or the formula (3)) constituting a base polymer not containing an electro-optic molecular moiety as a side chain with a repeating unit (for example, a repeating unit represented by the formula (2)) constituting a base polymer containing an electro-optic molecular moiety as a side chain. In this case, the copolymer may be a random copolymer, a block copolymer, or a graft copolymer.

[Chemical Formula 3]

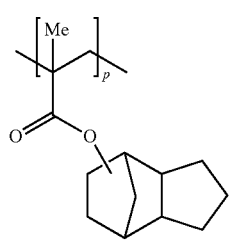

(1)

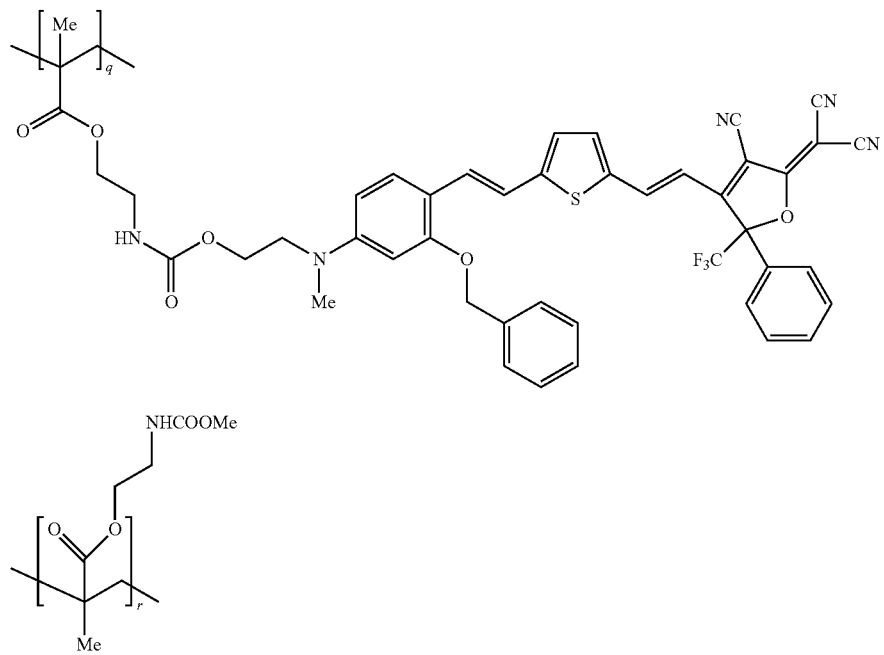

In the present embodiment, the "electro-optic polymer layer" means a layer composed of an electro-optic polymer.

The method for producing the electro-optic polymer layer is not particularly limited, and examples thereof include a spin coating method, a dip coating method, a spray coating method, a bar coating method, a flow coating method, a gravure coating method, and a roll coating method.

In the present embodiment, the "supporting body" means a substrate carrying an electro-optic polymer layer. The supporting body may have a single layer structure or a plurality of layer structures, depending on the application of the produced laminate for non-linear optics to be produced. The supporting body can be appropriately set depending on the application of the laminate for non-linear optics to be produced.

Examples of the supporting body include glass (for example, BK7 and the like), $SiO_2$ (for example, quartz glass), sol-gel glass (for example, MAPTMS and the like), a fluororesin (for example, PTFE, CYTOP (Asahi Glass Co., Ltd., registered trademark), Teflon (The Chemours Company, registered trademark) AF, and the like), polycarbonate (for example, poly[Bisphenol A carbonate-co-4,4'-(3,3,5-trimethylcyclo-hexylidene)diphenol carbonate] and the like), a (meth)acrylate polymer (for example, polymethyl methacrylate (PMMA), polydicyclopentanyl methacrylate (poly DCPMA), polyadamantyl methacrylate (poly AdMA), poly(DCPMA-co-MMA), poly(AdMA-co-MMA) and the like), a cycloolefin polymer (for example, ZEONEX (Zeon Corporation, registered trademark), ZEONOR (Zeon Corporation, registered trademark), ARTON (JSR, registered trademark), a cycloolefin copolymer (TOPAS (Topas Advanced Polymers GmbH, registered trademark)), APEL (Mitsui Chemicals Inc., registered trademark) and the like), Tsurupica (registered trademark), Daikyo Resin CZ, polystyrene, polyethylene, polymethylpentene (TPX (Mitsui Chemicals Inc., registered trademark)), polypropylene, polyimide, polyvinyl alcohol (PVA), polyethylene terephthalate, an ultraviolet curable resin (for example, SU8, UV15 and UV15LV manufactured by Master Bond Inc., NOA61, NOA65, NOA71 and NOA73 manufactured by Norland Products Inc., and the like), electro-optic polymers (including poly(Disperse Red 1 acrylate), poly(Disperse Red 1 methacrylate), poly(Disperse Red 13 acrylate), poly(Disperse Red 13 methacrylate), poly(Disperse Orange 3 acrylamide), poly(Disperse Orange 3 methacrylamide), poly(Disperse Yellow 7 acrylate), and poly(Disperse Yellow 7 methacrylate)). These can be used alone or in combination of two or more. In addition, the supporting body may contain dye molecules (including electro-optic molecules).

Examples of the supporting body include a semiconductor, an oxide, a nitride, an oxynitride, a ferroelectric compound, a metal, and a transparent conductive material. Examples of the semiconductor include IV group semiconductors such as diamond (C), silicon (Si), boron-doped silicon, phosphorus-doped silicon, silicon carbide (SiC), silicon germanium (SiGe) and germanium (Ge), III-V group semiconductors such as gallium arsenide (GaAs), indium phosphide (InP), gallium nitride (GaN) and gallium phosphide (GaP), and II-VI group semiconductors such as zinc selenide (ZnSe), cadmium sulfide (CdS), cadmium selenide (CdSe), telluride cadmium (CdTe), zinc sulfide (ZnS), zinc selenide (ZnSe), zinc telluride (ZnTe), and cadmium zinc telluride (CdZnTe). Examples of the oxide include silicon oxide, metal oxide [for example, titanium oxide ($TiO_2$), aluminum oxide ($Al_2O_3$), hafnium oxide ($HfO_2$), lanthanum oxide ($La_2O_3$), zirconium dioxide ($ZrO_2$), yttrium oxide ($Y_2O_3$), tantalum pentoxide ($Ta_2O_5$), zinc oxide (ZnO), gallium oxide ($Ga_2O_3$), magnesium oxide (MgO), and the like], hafnium silicate ($HfSiO_4$), and silicon dioxide ($SiO_2$). Examples of the nitride include silicon nitride, carbon nitride, and metal nitrides [for example, aluminum nitride (AlN), titanium nitride (TiN), and hafnium nitride (HfN) and the like]. Examples of the oxynitride include silicon oxynitride, and metal oxynitrides [for example, aluminum oxynitride (AlON) and hafnium oxynitride (HfON) and the like]. Examples of the ferroelectric compound include lithium niobate (LiNbO$_3$), lithium tantalate (LiTaO$_3$), and lanthanum-doped lead zirconate titanate (PLZT). Examples of the metal include gold (Au), silver (Ag), copper (Cu), platinum (Pt), and aluminum (Al). Examples of the transparent conductive material include ITO, IZO, FTO (fluorine-doped tin oxide), IGZO (InGaZnO), AZO (aluminum-doped zinc oxide), GZO (gallium-doped zinc oxide), and SnO$_2$. These can be used alone or in combination of two or more. The materials are suitably used for a layer in contact with the electro-optic polymer layer when the supporting body has a plurality of layer structures.

A suitable supporting body structure in each non-linear optical element will be described later.

Hereinafter, each step will be described in detail with reference to FIGS. 1 and 2.

(1) Step of Subjecting Electro-Optic Polymer Layer to Poling Processing

In the present embodiment, the "poling processing" means processing for orienting electro-optic molecules and fixing the orientation. The poling processing is not particularly limited. Examples thereof include a method for applying a voltage at a temperature near the glass transition temperature of an electro-optic polymer layer with the electro-optic polymer layer sandwiched between a lower electrode and an upper electrode, and a method for subjecting an electro-optic polymer layer to corona discharge.

For example, as shown in FIG. 1(a), an electro-optic polymer layer 10 may be subjected to poling processing as follows. A substrate 1, a lower electrode 2, electro-optic polymer layer 10, and an upper electrode 3 are laminated in this order, and a voltage is applied between lower electrode 2 and upper electrode 3 at a temperature near the glass transition temperature of electro-optic polymer layer 10.

(2) Step of Laminating Electro-Optic Polymer Layer Subjected to Poling Processing on Supporting Body In the present embodiment, "laminating" means stacking an electro-optic polymer layer subjected to poling processing on a supporting body. Here, the laminating step means eliminating a method for laminating an electro-optic polymer layer on a supporting body, and thereafter applying a voltage to the electro-optic polymer layer (poling processing), which has been conventionally performed. The laminating step is not particularly limited, and examples thereof include a method for transferring an electro-optic polymer layer subjected to poling processing on a lower electrode onto a supporting body. The laminating method is preferably performed by bonding the surface of the electro-optic polymer layer and the surface of the supporting body through a covalent bond, an electrostatic interaction, or a van der Waals interaction, or the like.

More specific examples thereof include the following method. After the poling processing is completed (FIG. 1(b)), an upper electrode 3 is first removed by wet etching and the like (FIG. 1(c), FIG. 2(a)). Thereafter, the surface of an electro-optic polymer layer 11 subjected to poling processing is subjected to oxygen plasma processing to activate the surface (FIG. 2(b)). Here, —COR in FIG. 2(b) represents an organic group containing a carbonyl group. Meanwhile, the surface of a supporting body 20 is subjected to oxygen plasma processing, and further processed by a silane coupling agent having an amino group, and the like to activate the surface (FIGS. 2(c) and 2(d)). Finally, electro-optic polymer layer 11 subjected to poling processing is transferred to supporting body 20 so that the activated surfaces face each other, and a substrate 1 and a lower electrode 2 are removed to obtain a laminate for non-linear optics 50 (FIG. 1(d), FIG. 2(e)). In the above-mentioned method, the silane coupling agent having an amino group is used as a reagent for bringing electro-optic polymer layer 11 and supporting body 20 into close contact, but in addition to this, a silane coupling agent having a vinyl group, an epoxy group, a styryl group, a methacryl group, an acryl group, an isocyanate group, an isocyanurate group, a ureido group, or a mercapto group, and the like may be used. Without using the silane coupling agent, the surface of electro-optic polymer layer 11 and the surface of supporting body 20 may be subjected to oxygen plasma processing to transfer electro-optic polymer layer 11 subjected to poling processing onto supporting body 20 so that the activated surfaces face each other. The surface of supporting body 20 may be subjected to oxygen plasma processing, and further processed by a silane coupling agent having an amino group to activate the surface, and electro-optic polymer layer 11 may be transferred onto supporting body 20 so that the activated surface of supporting body 20 and the surface of unprocessed electro-optic polymer layer 11 not subjected to oxygen plasma processing and silane coupling processing face each other. When electro-optic polymer layer 10 is simply supported on lower electrode 2 by a spin coating method, substrate 1 and lower electrode 2 can be removed by merely peeling off substrate 1 and lower electrode 2 from transferred electro-optic polymer layer 11 without being subjected to special processing.

Examples of another embodiment of the method for producing a laminate for non-linear optics according to the present embodiment include the following method. First, a roll of a long electro-optic polymer film (electro-optic polymer layer) and a roll of a long film type supporting body are prepared. The films are transported while the films are continuously unwound using an unwinding device. Each film is transported so that the longitudinal direction thereof is a transport direction. Here, the electro-optic polymer film that has been transported is subjected to corona discharge and the like to subject the electro-optic polymer film to poling processing (step of poling processing). Next, the electro-optic polymer film subjected to poling processing and the film type supporting body that are continuously transported are overlapped so that the longitudinal directions thereof (transport directions) are parallel to each other. A laminate of the overlapped films (laminate for non-linear optics) is passed between a pair of pasting rolls, to apply a pressure to the laminate, thereby pasting the films (step of laminating the electro-optic polymer layer on the supporting body).

The producing method according to the present embodiment may further include other steps such as a step of processing the electro-optic polymer layer subjected to poling processing after the above-described steps.

Examples of the other processing include:

(1) forming a mask on an electro-optic polymer layer 11 subjected to poling processing by photolithography and the like, and processing electro-optic polymer layer 11 into a waveguide structure and the like by dry etching and the like (FIG. 1(e)), (2) laminating a new layer (for example, an upper clad layer 25) on a waveguide 12 obtained by processing the electro-optic polymer layer subjected to poling processing (FIG. 1(f)), and (3) further laminating, on electro-optic polymer layer 11 laminated on a supporting body 20 and subjected to poling processing, another electro-optic polymer layer 11 subjected to poling processing (FIGS. 4(d), 4(e), 4(f)).

(Laminate for Non-Linear Optics)

A laminate for non-linear optics according to the present embodiment is a laminate for non-linear optics including:

a supporting body; and an electro-optic polymer layer laminated on the supporting body with being in contact with the supporting body, in which the electro-optic polymer layer contains an electro-optic molecule, and the electro-optic molecule in the electro-optic polymer layer is oriented in a predetermined direction.

Since the laminate for non-linear optics contains the electro-optic molecules oriented in a predetermined direction, the laminate for non-linear optics has a second-order non-linear optical effect. The second-order non-linear optical effect increases in proportion to the square of the intensity of an electromagnetic wave. Therefore, a frequency conversion efficiency is improved by using an electro-optic polymer waveguide having a small cross-sectional area and a large optical confinement effect, and the like. The second-order non-linear optical effect increases as an interaction distance between the electromagnetic wave and the electro-optic molecules increases. Therefore, frequency conversion can be efficiently performed by using an electro-optic polymer waveguide having a long waveguide length. For a non-linear optical element including an electro-optic polymer layer, the power of a laser beam that can be introduced can be increased as the thickness of the layer (cross-sectional area) increases, which makes it possible to improve the power of a generated terahertz wave.

In the laminate for non-linear optics in the present embodiment, one or more other layers may be further laminated on the electro-optic polymer layer laminated on the supporting body. The other layer may be composed of the same component as that of the supporting body or the electro-optic polymer layer, or may be composed of a different component.

The thickness of the electro-optic polymer layer can be appropriately set depending on the application of the laminate for non-linear optics, but it may be greater than or equal to 0.01 μm and less than or equal to 50 cm, greater than or equal to 0.05 μm and less than or equal to 10 cm, or greater than or equal to 0.5 μm and less than or equal to 1 cm. Here, the "thickness of the electro-optic polymer layer" means the shortest distance between two surfaces of the electro-optic polymer layer perpendicular to the laminating direction in the laminate for non-linear optics. The "thickness of the electro-optic polymer layer" can also be grasped as the shortest distance between two principal surfaces facing each other in the electro-optic polymer layer. The thickness is obtained as an average value of values measured at optional 3 to 10 positions by a stylus profile measuring method, an electron microscope method, an optical microscope method, an ellipsometry method, or a micrometer or the like.

The thickness of the supporting body can be appropriately set depending on the application of the laminate for non-linear optics, but it may be greater than or equal to 0.01 μm and less than or equal to 1000 cm, greater than or equal to 10 μm and less than or equal to 1000 cm, greater than or equal to 20 μm and less than or equal to 100 cm, greater than or equal to 30 μm and less than or equal to 10 cm, or greater than or equal to 40 μm and less than or equal to 1 cm. Here, the "thickness of the supporting body" means the shortest distance between the two surfaces of the supporting body perpendicular to the laminating direction in the laminate for non-linear optics. "The thickness of the supporting body" can also be grasped as the shortest distance between two principal surfaces facing each other in the supporting body. The thickness is obtained as an average value of values measured at optional 3 to 10 positions by a stylus profile measuring method, an electron microscope method, an optical microscope method, an ellipsometry method, or a micrometer or the like.

In the present embodiment, the adhesive strength between the supporting body and the electro-optic polymer layer is preferably greater than or equal to 0.01 N/mm$^2$ and less than or equal to 20 N/mm$^2$, more preferably greater than or equal to 0.05 N/mm$^2$ and less than or equal to 10 N/mm$^2$, and greater than or equal to 0.1 N/mm$^2$ and less than or equal to 5 N/mm$^2$. The adhesive strength can be measured by, for example, a pull-off method.

The laminate for non-linear optics according to the present embodiment is suitably used for producing a non-linear optical element. Examples of the non-linear optical element include a waveguide element for terahertz wave, a non-linear optical element for high-power laser, and a light modulation element. Hereinafter, each non-linear optical element will be described.

(Waveguide Element for Terahertz Wave)

The waveguide element for terahertz wave according to the present embodiment includes the laminate for non-linear optics (including the supporting body and the electro-optic polymer layer). The supporting body contains a cycloolefin polymer or a cycloolefin copolymer.

The cycloolefin polymer and the cycloolefin copolymer have a small terahertz wave absorption loss. Therefore, the waveguide element for terahertz wave according to the present embodiment can efficiently generate or detect a terahertz wave.

In a conventional technique for producing a waveguide containing an electro-optic polymer, a lower poling electrode is first formed on a substrate, and a clad layer, a core layer containing an electro-optic polymer, and a clad layer are formed in this order on the lower poling electrode. Furthermore, an upper poling electrode is formed on the clad layer. Thereafter, the electro-optic polymer is subjected to poling processing by applying a voltage between the two poling electrodes (PTLs 1 to 5). Here, in the conventional technique, in the waveguide element using the electro-optic polymer, a material used for a clad layer around a core layer containing an electro-optic polymer had to have a lower electrical resistivity than that of the electro-optic polymer from the viewpoint of suppressing voltage drop in the clad layer in poling processing. The electrical resistivity of the material used for the clad layer is typically $10^8$ Ω·m. In the waveguide element prepared by poling processing according to the method, the clad layer that is present during poling processing and has a small electrical resistivity remains as it is even in the produced waveguide element.

However, materials having a low electrical resistivity (or conductive material) and many common materials have been known to sufficiently absorb the terahertz wave due to the molecular vibration, lattice vibration, and conductivity and the like of the materials. That is, in order to attain a waveguide element for terahertz wave such as a highly efficient terahertz wave generating element or detecting element, it is necessary to use, as a clad layer material, a material having a small terahertz wave absorption loss (hereinafter, may be referred to as "terahertz wave low absorption loss material"). The terahertz wave generated from the core layer containing the electro-optic polymer, or the terahertz wave that is detected and is introduced from the outside is less likely to be absorbed and lost.

However, for example, when the electrical resistivity of the clad layer is larger than the electrical resistivity of the core layer containing the electro-optic polymer, large voltage drop occurs in a portion of the clad layer even when a predetermined voltage is applied, and a voltage applied to the core layer containing the electro-optic polymer is decreased, so that efficient poling processing cannot be performed. The use of the terahertz wave low absorption loss material for the clad layer has been suggested by simulations in the design of the waveguide element for terahertz wave (F. A. Vallejo, L. M. Hayden, "Simplified model for optical rectification of broadband terahertz pulses in lossy waveguides including a new generalized expression for the coherence length,", Opt. Express, vol. 21, 24398-24412 (2013) (NPL 1)), but such a specific method for producing a waveguide element has not been revealed so far.

The waveguide element for terahertz wave according to the present embodiment is produced by subjecting an electro-optic polymer layer as a core layer to poling processing according to the method for producing a laminate for non-linear optics according to the present embodiment, and thereafter laminating the core layer subjected to poling processing on a clad layer (supporting body) containing a terahertz wave low absorption loss material. This is possible to produce a predetermined waveguide element for terahertz wave without being limited by the condition of the poling processing.

The cycloolefin polymer is a polymer of a cycloolefin, and examples thereof include polynorbornene. The cycloolefin includes a polymerizable cycloolefin having an ethylenic double bond, and includes a bicyclic olefin, a monocyclic olefin, or a tricyclic or higher polycyclic olefin. Typical examples of the bicyclic olefin include norbornene (2-norbornene) that may have a substituent. Examples of the monocyclic olefin include cyclic $C_{4-12}$ cycloolefins such as cyclobutene, cyclopentene, cycloheptene, and cyclooctene. Examples of the polycyclic olefin include dicyclopentadiene that may have a substituent. The cycloolefin polymer may be, for example, a polymer having a repeating unit represented by the formula (4) (wherein n represents a positive integer). These can be used alone or in combination of two or more.

Examples of the cycloolefin copolymer include a copolymer of a cycloolefin and a chain olefin, a copolymer of a cycloolefin polymer and an olefin polymer, and a copolymer of a first cycloolefin polymer and a second cycloolefin polymer. Examples of the chain olefin include chain $C_{2-10}$ olefins such as ethylene, propylene, 1-butene, isobutene, 1-pentene, 3-methyl-1-pentene, 1-hexene, and 1-octene. The copolymer may be a random copolymer, a block copolymer, or a graft copolymer. The cycloolefin copolymer may be, for example, a copolymer having a repeating unit represented by the formula (5) (wherein x and y each represent a positive integer). These can be used alone or in combination of two or more.

[Chemical Formula 4]

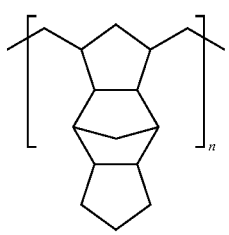

(4)

-continued

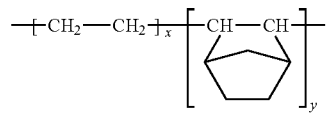

(5)

A commercially available cycloolefin polymer and cycloolefin copolymer may be used. Examples of the commercially available cycloolefin polymer include ZEONEX (registered trademark), ZEONOR (registered trademark), and ARTON (registered trademark). Examples of the commercially available cycloolefin copolymer include TOPAS (registered trademark) and APEL (registered trademark).

Figure 2:
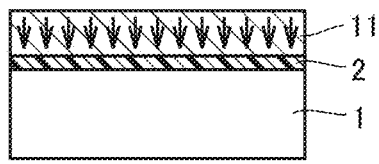
FIG. 2 is a schematic view showing an example of a method for laminating an electro-optic polymer layer subjected to poling processing on a supporting body.
Figure 2:
Figure 2:
Figure 2:
Figure 2:
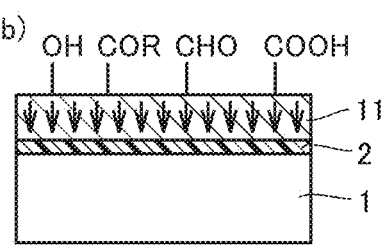
Figure 2:
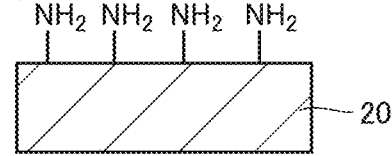
Figure 2:
Figure 2:
Figure 2:
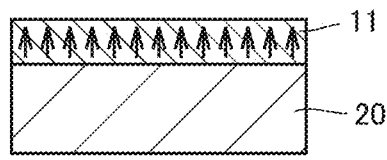

FIG. 1 is a schematic view showing an example of a method for producing a laminate for non-linear optics and a waveguide including the laminate. Here, in FIG. 1(b) and the like, a plurality of arrows drawn in an electro-optic polymer layer 11 subjected to poling processing indicate that electro-optic molecules in electro-optic polymer layer 11 are oriented. Hereinafter, an example of a method for producing a waveguide element for terahertz wave will be described with reference to FIG. 1. First, a lower electrode 2 is formed on a substrate 1, and an electro-optic polymer layer 10 is formed thereon by a spin coating method or the like. Furthermore, an upper electrode 3 is formed on electro-optic polymer layer 10. Thereafter, electro-optic polymer layer 10 is subjected to poling processing by applying a predetermined voltage between lower electrode 2 and upper electrode 3 at a temperature near the glass transition temperature of the electro-optic polymer layer (FIGS. 1(a) and 1(b)). After the poling processing, upper electrode 3 is removed by wet etching or the like (FIG. 1(c), FIG. 2(a)), and oxygen plasma processing using a reactive ion etching apparatus and the like is performed (FIG. 2(b)). Separately, a terahertz wave low absorption loss material supporting body 20 subjected to oxygen plasma processing using the reactive ion etching apparatus and the like is processed by a silane coupling agent having an amino group, and the like (FIGS. 2(c) and 2(d)). Thereafter, electro-optic polymer layer 11 is transferred by subjecting both the substrates to pressure bonding while applying heat, and substrate 1 and lower electrode 2 are removed (FIGS. 1(d), 2(e)). Thereafter, transferred electro-optic polymer layer 11 is processed into a waveguide structure by dry etching and the like (FIG. 1(e)). Furthermore, a solution containing a terahertz wave low absorption loss material is applied onto a waveguide structure 12, thereby forming an upper clad layer 25 containing the terahertz wave low absorption loss material (FIG. 1(f)). Through these processes, the waveguide element for terahertz wave including upper and lower clad layers containing the terahertz wave low absorption loss material is produced.

Figure 3:
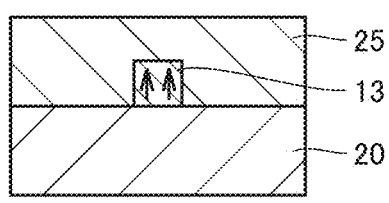
FIG. 3 is a schematic view showing an example of a waveguide element for terahertz wave including a laminate for non-linear optics.
Figure 3:
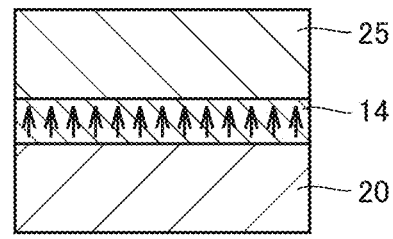
Figure 3:
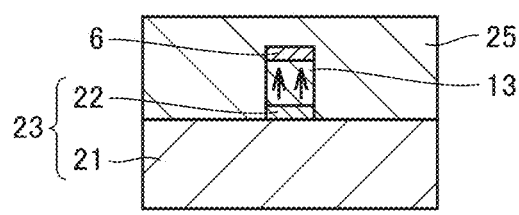
Figure 3:
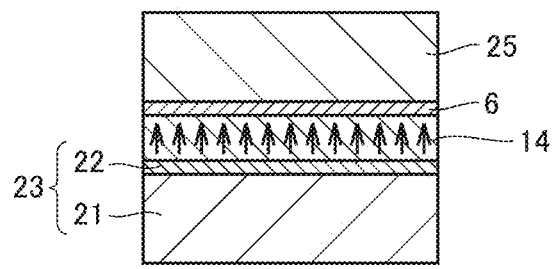
Figure 3:
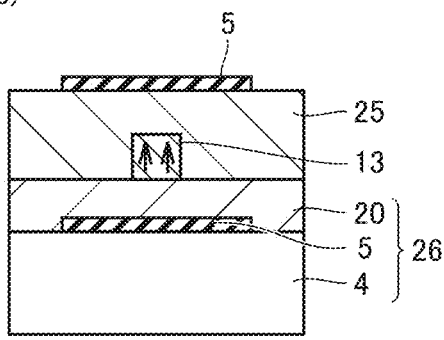
Figure 3:
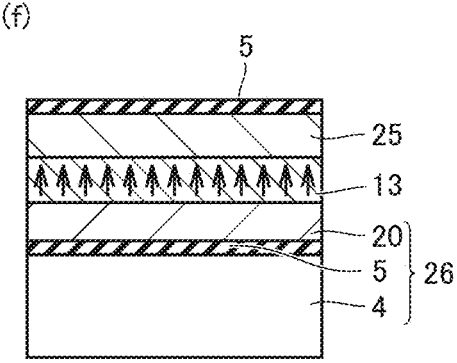

FIG. 3 is a schematic view showing an example of a waveguide element for terahertz wave including a laminate for non-linear optics produced by the producing method of the present embodiment. The schematic view shows the cross section of a waveguide. In the structures shown in FIGS. 3(a) and 3(b), clad layers 20 and 25 containing a terahertz wave low absorption loss material are disposed above and below waveguides 13 and 14 containing the electro-optic polymer subjected to poling processing so as to be in contact with waveguides 13 and 14. In the structures shown in FIGS. 3(c) and 3(d), layers 6 and 22 containing a material having a larger refractive index than that of the electro-optic polymer layer constituting guides 13 and 14

(hereinafter, may be referred to as high refractive index material) are disposed so as to be in contact with waveguides 13 and 14. Furthermore, clad layers 21 and 25 containing a terahertz wave low absorption loss material are disposed above and below high refractive index material layers 6 and 22. Here, the waveguide elements having the structures shown in FIGS. 3(c) and 3(d) are produced using a supporting body 23 including a clad layer 21 and a high refractive index material layer 22. In the structures shown in FIGS. 3(e) and 3(f), clad layers 20 and 25 containing a terahertz wave low absorption loss material are disposed above and below waveguide 13 so as to be in contact with waveguide 13. Furthermore, metal layers 5 and 5 are disposed above and below clad layers 20 and 25. Here, the waveguide elements having the structures shown in FIGS. 3(e) and 3(f) are produced using a supporting body 26 including a substrate 4, a metal layer 5, and a clad layer 20. In the structures illustrated in FIGS. 1 and 3, clad layers 20, 21, and 25 including a terahertz wave low absorption loss material are disposed around waveguides 12, 13, and 14 including an electro-optic polymer layer. As a result, the terahertz waves generated from waveguides 12, 13, and 14 including the electro-optic polymer layer are less likely to be absorbed and lost by clad layers 20, 21, and 25, whereby the terahertz waves can be efficiently generated. The terahertz wave that is detected and introduced from the outside is less likely to be absorbed and lost by clad layers 20, 21, and 25, whereby the terahertz wave can be efficiently detected.

The shape of the waveguide is not particularly limited, and examples thereof include a slab type, a channel type, a ridge type, and a rib type. In order to prepare the channel type waveguide and the like, dry etching, reactive ion etching, a photolithography method, an imprinting method, and a photobleaching method and the like can be used.

(Non-Linear Optical Element for High-Power Laser)

A non-linear optical element for high-power laser according to the present embodiment includes the laminate for non-linear optics according to the present embodiment (including a supporting body and an electro-optic polymer layer), in which the electro-optic polymer layer has a thickness of greater than or equal to 5 μm and less than or equal to 50 cm.

In the non-linear optical element according to the present embodiment, the thickness of the electro-optic polymer layer is greater than or equal to 5 μm and less than or equal to 50 cm, whereby the output (power) of the laser beam to be introduced can be increased, which provides improved power of the generated terahertz wave.

The conventional technique made it necessary to apply a high voltage in order to subject an electro-optic polymer film having a large film thickness to poling processing when a non-linear optical element including an electro-optic polymer film is produced. However, there is a limit to the voltage of a general-purpose high-voltage power supply, which disadvantageously causes a limited thickness of the electro-optic polymer film that can be subjected to poling processing. In the poling processing of the electro-optic polymer film having a large film thickness by applying a high voltage, a large current flows due to a charge injection barrier at the interface between an electrode for poling processing and the electro-optic polymer film, which causes breakdown. The electro-optic polymer film is broken by the breakdown, which disadvantageously causes a limited thickness of the electro-optic polymer film that can be subjected to poling processing.

The non-linear optical element for high-power laser according to the present embodiment can be produced by a method for producing a laminate for non-linear optics according to the present embodiment. Specifically, first, a laminate for non-linear optics is produced by a method including:
  a step of subjecting a first electro-optic polymer layer to poling processing, and
  a step of laminating the first electro-optic polymer layer subjected to poling processing on a supporting body.

Next, a second electro-optic polymer layer having the same composition as the composition of the first electro-optic polymer layer is subjected to poling processing, and the second electro-optic polymer layer subjected to poling processing is then laminated on the first electro-optic polymer layer in the laminate for non-linear optics.

Furthermore, if necessary, a third electro-optic polymer layer having the same composition as the composition of the first electro-optic polymer layer may be subjected to poling processing, and the third electro-optic polymer layer subjected to poling processing may be then laminated on the second electro-optic polymer layer in the laminate for non-linear optics. By sequentially laminating the electro-optic polymer layers subjected to poling processing, a non-linear optical element for high-power laser, including an electro-optic polymer layer having a predetermined thickness can be produced without being limited by the condition of the poling processing. In the present embodiment, the "high power laser" means a laser having a peak output of greater than or equal to $10 \times 10^{-3}$ W and less than or equal to $1 \times 10^{14}$ W. The peak output is preferably greater than or equal to $20 \times 10^{-3}$ W and less than or equal to $1 \times 10^{12}$ W, and more preferably greater than or equal to $50 \times 10^{-3}$ W and less than or equal to $5 \times 10^{11}$ W.

The electro-optic polymer layer has a thickness of greater than or equal to 5 μm and less than or equal to 50 cm, preferably greater than or equal to 10 μm and less than or equal to 10 cm, and more preferably greater than or equal to 20 μm and less than or equal to 1 cm.

Figure 4:
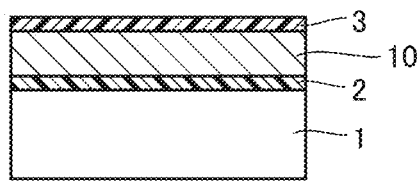
FIG. 4 is a schematic view showing an example of a method for producing a laminate for non-linear optics for high-power lasers.
Figure 4:
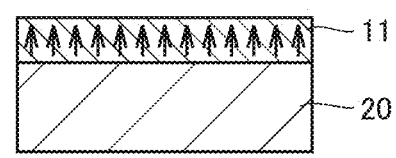
Figure 4:
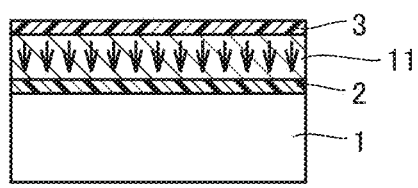
Figure 4:
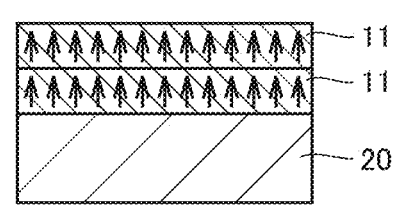
Figure 4:
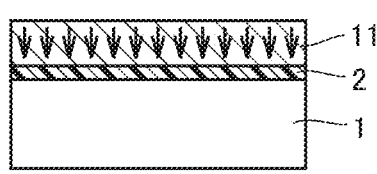
Figure 4:
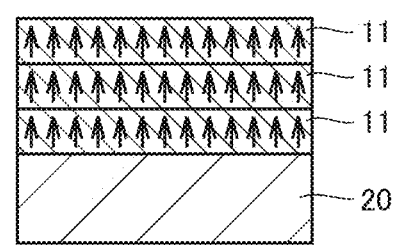

FIG. 4 is a schematic view showing an example of a method for producing a laminate for non-linear optics for high-power lasers. By repeating the laminating process a plurality of times (FIGS. 4(d), 4(e), and 4(f)), a laminate for non-linear optics including an electro-optic polymer layer having a large thickness is produced.

Since the laminate for non-linear optics shown in FIG. 4 includes an electro-optic polymer layer having an optional large thickness, the laminate for non-linear optics is suitably used for producing a non-linear optical element for high-power laser. As the thickness of the electro-optic polymer layer increases, the power of a laser beam that can be introduced into the electro-optic polymer layer can be increased. Therefore, the power of the terahertz wave generated in the non-linear optical element is improved.

(Light Modulation Element)

A light modulation element according to the present embodiment includes the laminate for non-linear optics according to the present embodiment (including a supporting body and an electro-optic polymer layer), in which
  the supporting body contains at least one selected from the group consisting of glass, $SiO_2$, sol-gel glass, a fluororesin, polycarbonate, a (meth)acrylate polymer, a cycloolefin polymer, a cycloolefin copolymer, polystyrene, polyethylene, polymethylpentene, polypropylene, polyimide, polyvinyl alcohol, polyethylene terephthalate, an ultraviolet curable resin, silicon, gallium arsenide, indium phosphide, titanium oxide, zinc oxide, aluminum oxide, silicon nitride, aluminum nitride, ITO, IZO, and IGZO.

The light modulation element according to the present embodiment has the above configuration, whereby the light modulation element can be used at a lower operating voltage and power consumption than those of the conventional light modulation element.

Conventionally, when a non-linear optical element was used as a light modulation element, a material used for a clad layer around a core layer containing an electro-optic polymer had to have a low electrical resistivity from the viewpoint of suppressing voltage drop in the clad layer in poling processing. Therefore, there is a limit to the material that can be used for the clad layer, which causes a problem that a material that enables phase modulation at a low voltage and has a small refractive index, or an optional material cannot be used as the material of the clad layer.

The light modulation element according to the present embodiment is produced by subjecting an electro-optic polymer layer as a core layer to poling processing according to the method for producing a laminate for non-linear optics according to the present embodiment, and thereafter laminating the core layer subjected to poling processing on a supporting body (clad layer) containing an optional material. Therefore, it becomes possible to produce a predetermined light modulation element without being limited by the condition of the poling processing.

Figure 5:
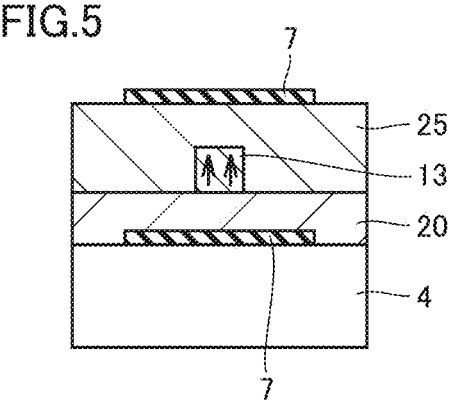
FIG. 5 is a schematic view showing an example of a light modulation element including a laminate for non-linear optics.

FIG. 5 is a schematic view showing an example of a light modulation element including a laminate for non-linear optics produced by the producing method according to the present embodiment. In a structure shown in FIG. 5, clad layers 20 and 25 including a low refractive index material are disposed around a waveguide 13 including an electro-optic polymer layer. It has been known that, as the refractive indexes of clad layers 20 and 25 with respect to the refractive index of waveguide 13 are smaller, a mode size in the waveguide is smaller. As the mode size is smaller, the interaction between the mode and light modulation electrodes 7 and 7 disposed above and below is smaller, which causes a decreased loss of light. Therefore, the distance between light modulation electrodes 7 and 7 can be reduced, which can provide a decreased operating voltage. That is, the light modulation element shown in FIG. 5 has an effect of reducing the operating voltage and power consumption of a light modulator.

The material used for the supporting body is not particularly limited as long as the material forms the waveguide together with the electro-optic polymer layer. The material used for the supporting body contains, for example, at least one selected from the group consisting of glass (for example, BK7 and the like), SiO$_2$ (for example, quartz glass), sol-gel glass (for example, MAPTMS and the like), a fluororesin (for example, PTFE, CYTOP, Teflon AF and the like), polycarbonate (for example, poly[Bisphenol A carbonate-co-4,4'-(3,3,5-trimethylcyclo-hexylidene)diphenol carbonate] and the like), a (meth)acrylate polymer (for example, polymethyl methacrylate (PMMA), polycyclopentanyl methacrylate (poly DCPMA), polyadamantyl methacrylate (poly AdMA), poly (DCPMA-co-MMA), poly (AdMA-co-MMA), and the like), a cycloolefin polymer (for example, ZEONEX (registered trademark), ZEONOR (registered trademark), ARTON (registered trademark) and the like), a cycloolefin copolymer (for example, TOPAS (registered trademark), APEL (registered trademark) and the like), Tsurupica (registered trademark), polystyrene, polyethylene, polymethylpentene (TPX (Mitsui Chemicals Inc., registered trademark)), polypropylene, polyimide, polyvinyl alcohol (PVA), polyethylene terephthalate, an ultraviolet curable resin (for example, SU8, UV15 and UV15LV manufactured by Master Bond Inc., NOA61, NOA65, NOA71 and NOA73 manufactured by Norland Products Inc., and the like), other EO polymer (for example, poly(Disperse Red 1 acrylate), poly(Disperse Red 1 methacrylate), poly(Disperse Red 13 acrylate), poly(Disperse Red 13 methacrylate), poly(Disperse Orange 3 acrylamide), poly(Disperse Orange 3 methacrylamide), poly(Disperse Yellow 7 acrylate), poly(Disperse Yellow 7 methacrylate)), silicon, gallium arsenide, indium phosphide, titanium oxide, zinc oxide, aluminum oxide, silicon nitride, aluminum nitride, ITO, IZO, and IGZO and the like.

The electrode is not particularly limited, and examples thereof include indium tin oxide (ITO), gold, silver, chromium, aluminum, titanium, indium zinc oxide (IZO), and aluminum-doped zinc oxide. These can be used alone or in combination of two or more.

(Free-Standing Electro-Optic Polymer Laminate)

A free-standing electro-optic polymer laminate according to the present embodiment includes the laminate for non-linear optics according to the present embodiment (including a supporting body and an electro-optic polymer layer), in which the supporting body is an electro-optic polymer having the same composition as or a different composition from the composition of the electro-optic polymer layer.

The free-standing electro-optic polymer laminate according to the present embodiment can be used for applications such as a terahertz wave generation device, a terahertz wave detection device, and a light modulation element.

In the present embodiment, the "free-standing electro-optic polymer laminate" means a laminate including the plurality of electro-optic polymer layers, in which the supporting body is an electro-optic polymer. In another aspect, the supporting body in the free-standing electro-optic polymer laminate can also be grasped as the electro-optic polymer layer subjected to poling processing.

Figure 12:
FIG. 12 is a schematic view showing an example of a method for producing a free-standing electro-optic polymer laminate.
Figure 12:
Figure 12:
Figure 12:
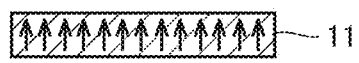
Figure 12:
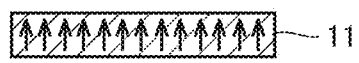
Figure 12:
Figure 12:
Figure 12:
Figure 12:
Figure 12:
Figure 12:
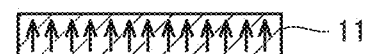
Figure 12:
Figure 12:
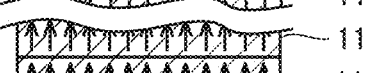
Figure 12:
Figure 12:
Figure 12:

FIG. 12 is a schematic view showing an example of a method for producing a free-standing electro-optic polymer laminate. Specifically, by a method including a step of subjecting a first electro-optic polymer layer to poling processing (FIG. 12(a)), a step of subjecting a second electro-optic polymer layer having the same composition as or a different composition from the composition of the first electro-optic polymer layer to poling processing, and a step of laminating the second electro-optic polymer layer subjected to poling processing on the first electro-optic polymer layer subjected to poling processing (FIGS. 12(b) and 12(c)), the free-standing electro-optic polymer laminate is produced.

Furthermore, if necessary, a third electro-optic polymer layer having the same composition as or a different composition from the composition of the first electro-optic polymer layer may be subjected to poling processing, and the third electro-optic polymer layer subjected to poling processing may be then laminated on the second electro-optic polymer layer in the free-standing electro-optic polymer laminate (FIGS. 12(d) and 12(e)). Furthermore, another new free-standing electro-optic polymer laminate may be laminated on the free-standing electro-optic polymer laminate. By sequentially laminating the electro-optic polymer layers subjected to poling processing, a free-standing electro-optic polymer laminate having a predetermined thickness can be produced without being limited by the condition of the poling processing ((FIG. 12(f)).

The thickness of the free-standing electro-optic polymer laminate can be appropriately set according to the application of the free-standing electro-optic polymer laminate. The thickness of the free-standing electro-optic polymer laminate may be greater than or equal to 0.02 μm and less than or equal to 50 cm, greater than or equal to 0.1 μm and less than or equal to 40 cm, greater than or equal to 1 μm and less than or equal to 10 cm, or greater than or equal to 10 μm and less than or equal to 1 cm.

EXAMPLES

Hereinafter, the present invention will be more specifically described with reference to Examples; however, the present invention is not limited thereto.

Example 1 (Preparation of Laminate for Non-Linear Optics Used for Waveguide Element for Terahertz Wave)

A side chain type electro-optic polymer (random copolymer) layer (hereinafter, may be referred to as "electro-optic polymer layer") containing repeating units represented by the following chemical formulae (1) to (3) (wherein p, q and r each represent a positive integer) by a spin coating method was formed on an indium tin oxide electrode (ITO electrode). The thickness of the electro-optic polymer layer was 2.4 to 2.6 μm as measured by a stylus profile measuring method. Here, the thickness was determined as an average value of values measured at three locations on the main surface of the electro-optic polymer layer. An indium zinc oxide electrode (IZO electrode) was formed on the electro-optic polymer layer by a sputtering method to obtain a sample before poling processing. The electro-optic polymer layer was then subjected to poling processing by applying a voltage of 110 to 115 V/μm between the ITO electrode and the IZO electrode while heating the sample to a temperature of 150° C. that was close to the glass transition point (160° C.) of the electro-optic polymer, and cooled to room temperature while maintaining the voltage. The electro-optic constant ($r_{33}$) of the electro-optic polymer layer measured by a transmission ellipsometry method (T. Yamada, A. Otomo, "Transmission ellipsometric method without an aperture for simple and reliable evaluation of electro-optic properties", Opt. Express, vol. 21, 29240-29248 (2013)) was 56 to 66 pm/V at a wavelength of 1308 nm and 44 to 49 pm/V at a wavelength of 1550 nm. After the poling processing, the IZO electrode was removed by a wet etching method, and the surface of the electro-optic polymer layer was subjected to oxygen plasma processing using a reactive ion etching apparatus (RIE-10NR, manufactured by Samco Inc.) (hereinafter, the obtained sample may be referred to as "sample A"). A cycloolefin copolymer (TOPAS (registered trademark) 5013) supporting body subjected to oxygen plasma processing using the reactive ion etching apparatus was processed by a silane coupling agent having an amino group (KBP-90, manufactured by Shin-Etsu Chemical Co., Ltd.) (hereinafter, the obtained sample may be referred to as "sample B"). Similarly, a cycloolefin polymer (ZEONEX (registered trademark) 480R) supporting body subjected to oxygen plasma processing using the reactive ion etching apparatus was processed by the silane coupling agent having an amino group (hereinafter, the obtained sample may be referred to as "sample C"). By subjecting sample A and sample B or sample C to pressure bonding at 100° C. so that the processed surfaces faced each other, the electro-optic polymer layer was transferred and laminated onto the cycloolefin copolymer or cycloolefin polymer supporting body. Here, the adhesive strength between the electro-optic polymer layer and the supporting body in the laminate for non-linear optics obtained by subjecting sample A and sample B to pressure bonding was 0.75 N/mm² as measured by a pull-off method.

[Chemical Formula 5]

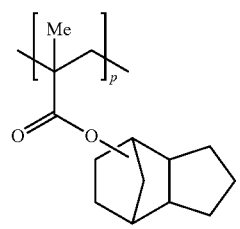

(1)

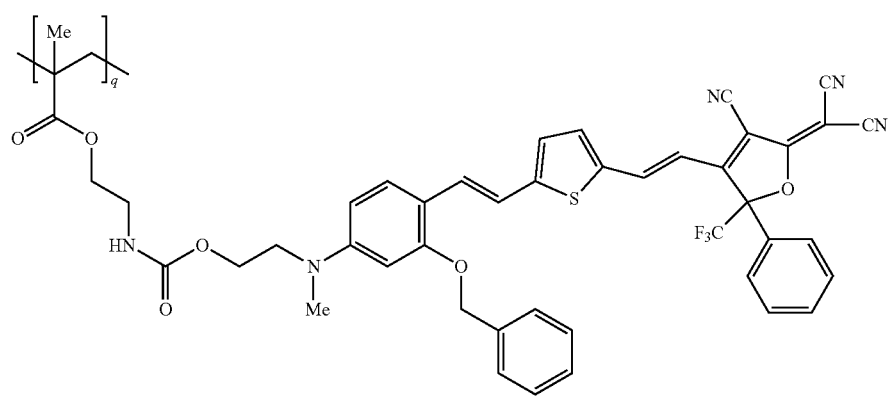

(2)

-continued

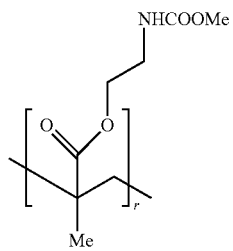

(3)

Figure 6:
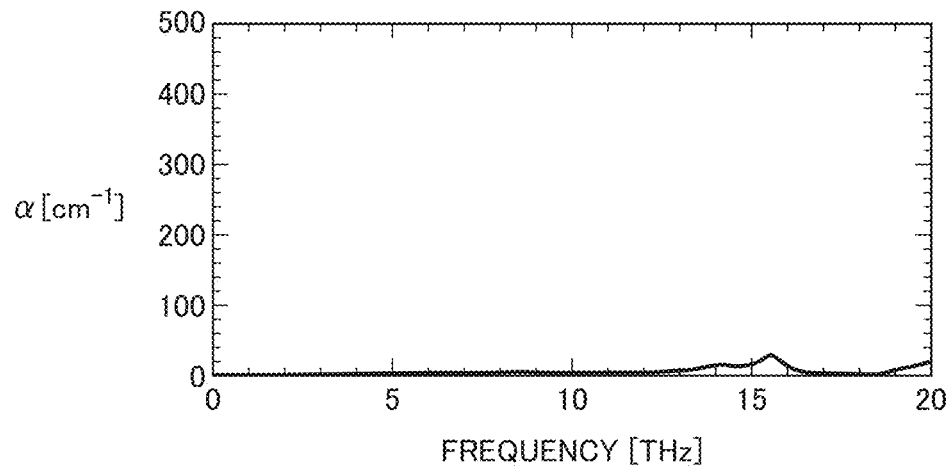
FIG. 6 is a graph showing absorption spectra in a terahertz wave region of a cycloolefin copolymer, a cycloolefin polymer, and polymethyl methacrylate.
Figure 6:
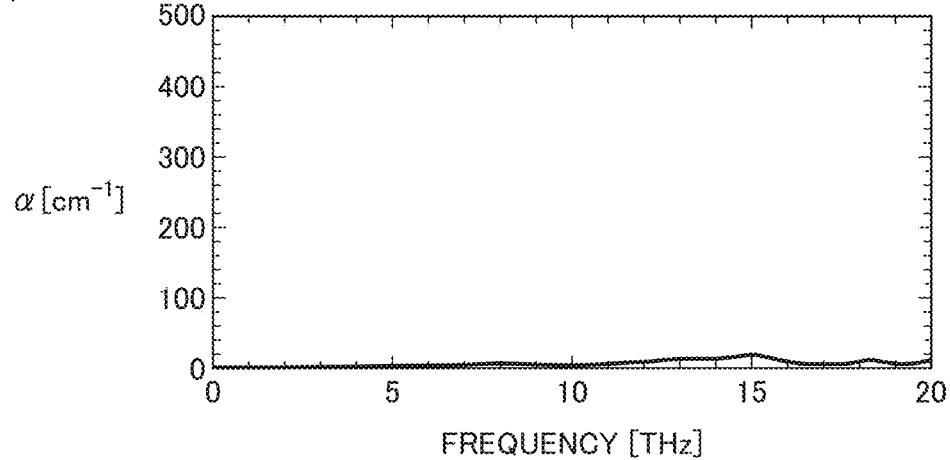
Figure 6:
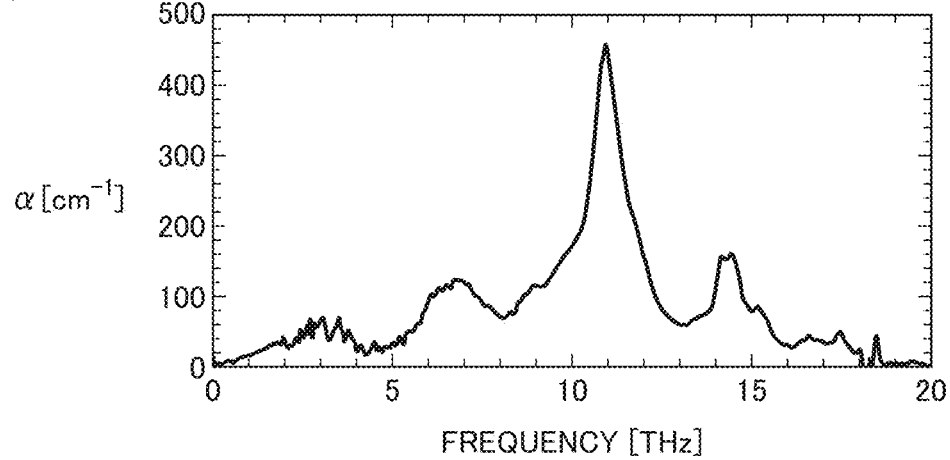

FIG. 6 showed absorption spectra in the terahertz wave band of the cycloolefin copolymer and the cycloolefin polymer used as the supporting body (FIGS. 6(a) and 6(b)). The absorption coefficients of the cycloolefin copolymer and cycloolefin polymer at 0.1 to 10 THz were less than or equal to 5 cm$^{-1}$. For comparison, the absorption spectrum in the terahertz region of polymethyl methacrylate (PMMA) that was a general polymer as a transparent resin, as with the cycloolefin copolymer or the cycloolefin polymer, was shown (FIG. 6(c)). It was found that the cycloolefin copolymer and the cycloolefin polymer used as the supporting body have smaller absorption in the terahertz wave band than that of a general polymer, and are suitable as a clad layer of a waveguide element for terahertz wave.

Figure 7:
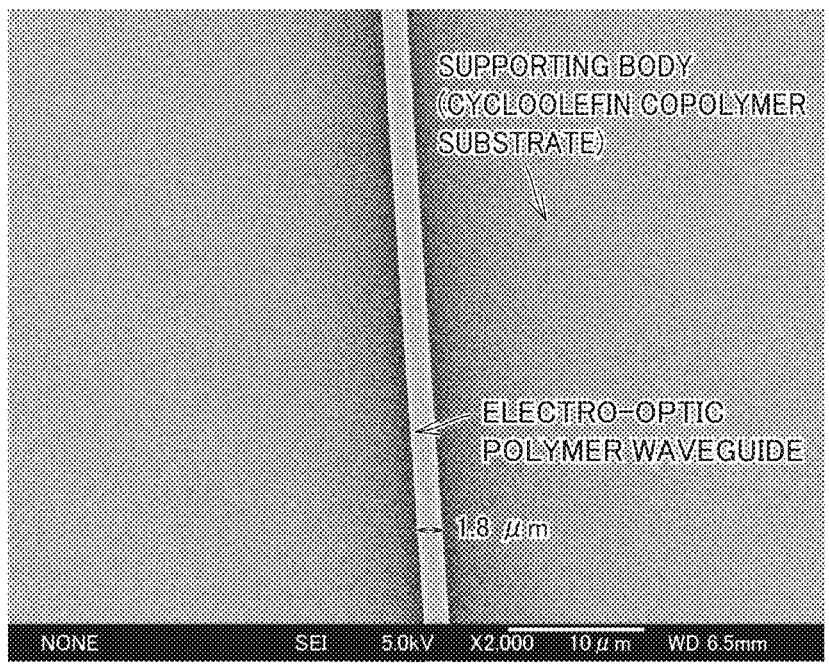
FIG. 7 is a scanning microscope image of a waveguide element for terahertz wave according to Examples.
Figure 8:
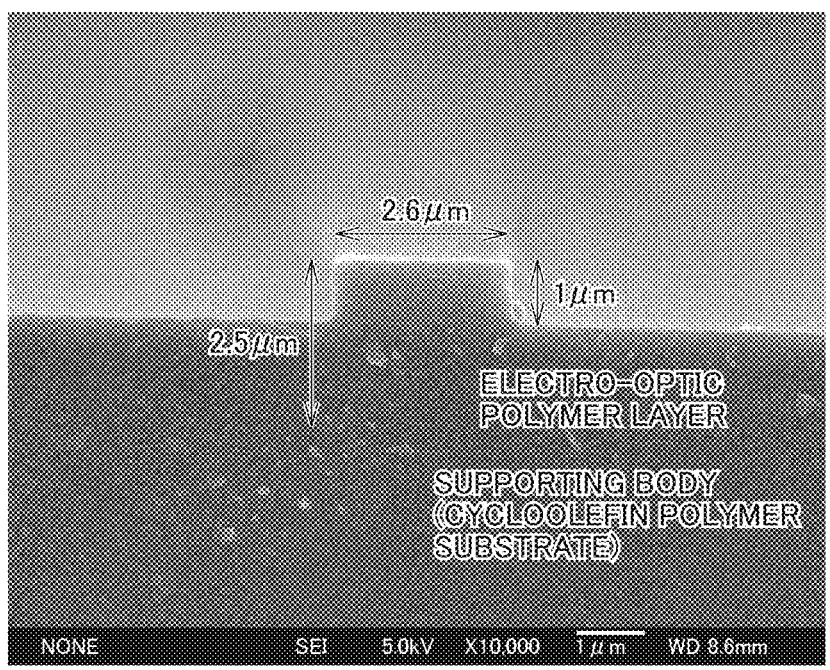
FIG. 8 is a scanning microscope image of a waveguide element for terahertz wave according to Examples.

In the laminate for non-linear optics obtained by the above-mentioned method, a mask was then formed on the electro-optic polymer layer by photolithography, and the electro-optic polymer layer was processed into a waveguide structure by a dry etching method using a reactive ion etching apparatus (FIGS. 7 and 8). FIG. 7 is a channel type electro-optic polymer waveguide structure (top image) on a cycloolefin copolymer supporting body. FIG. 8 is a ridge type electro-optic polymer waveguide structure (cross-sectional image) on a cycloolefin polymer supporting body.

Example 2 (Preparation of Laminate for Non-Linear Optics Used for Non-linear Optical Element for High-Power Laser)

Figure 9:
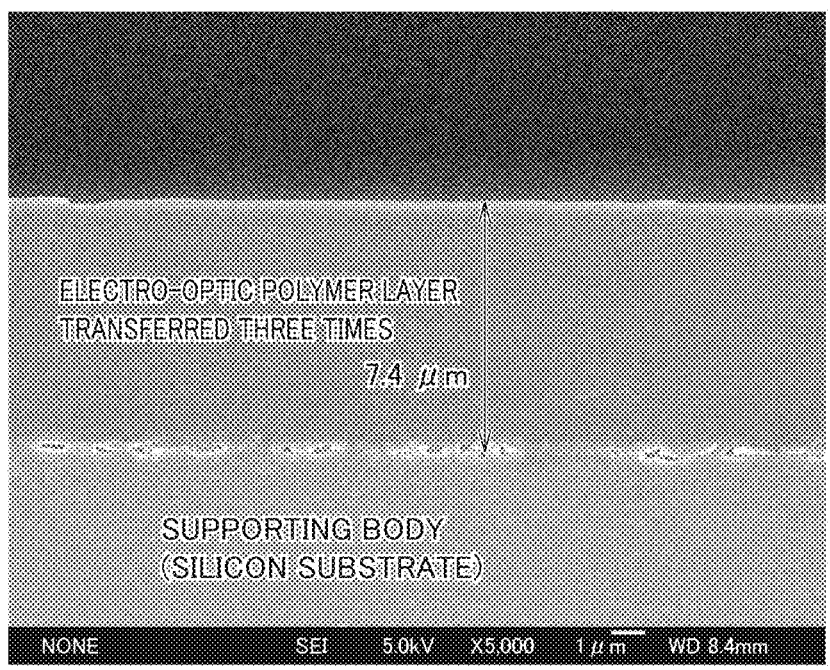
FIG. 9 is a scanning microscope image of a laminate for non-linear optics used in a non-linear optical element for high-power laser according to Examples.

A silicon supporting body including a thermal oxide film subjected to oxygen plasma processing using a reactive ion etching apparatus was processed by a silane coupling agent having an amino group (hereinafter, the obtained sample may be referred to as "sample D"). By subjecting sample A and sample D to pressure bonding at 100° C. so that the processed surfaces faced each other, the electro-optic polymer layer was transferred and laminated onto the silicon supporting body. The surface of the electro-optic polymer layer transferred onto the silicon supporting body was subjected to oxygen plasma processing using the reactive ion etching apparatus, and processed by a silane coupling agent having an amino group (hereinafter, the obtained sample may be referred to as "sample E"). By subjecting another new sample A and sample E to pressure bonding at 100° C. so that the processed surfaces faced each other, the electro-optic polymer layer was further transferred and laminated onto the electro-optic polymer layer on the silicon supporting body. By repeating this process, a laminate for non-linear optics was prepared, in which three electro-optic polymer layers were laminated. The thickness of the laminated electro-optic polymer layer was 7.4 μm as measured by a stylus profile measuring method (FIG. 9).

(Method for Measuring Adhesive Strength by Pull-Off Method)

A cylinder having a diameter of 7 mm and the electro-optic polymer layer laminated on the supporting body were bonded to each other using a two-component mixed epoxy adhesive. The adhesive was cured, and the cylinder was then pulled up at a speed of 1 mm/min using a precision universal testing machine (Autograph, manufactured by Shimadzu Corporation) to measure a force (adhesive strength) at which the electro-optic polymer layer and the supporting body were peeled off from each other.

The adhesive strength between the electro-optic polymer layer and the supporting body is large, which provides effects such as an effect of preventing the electro-optic polymer layer from being peeled from the supporting body when a non-linear optical element is diced.

Example 3 (Preparation of Waveguide Element for Terahertz Wave)

Figure 10:
FIG. 10 is a scanning electron microscope image in the cross section of a waveguide element for terahertz wave according to Examples.
Figure 11:
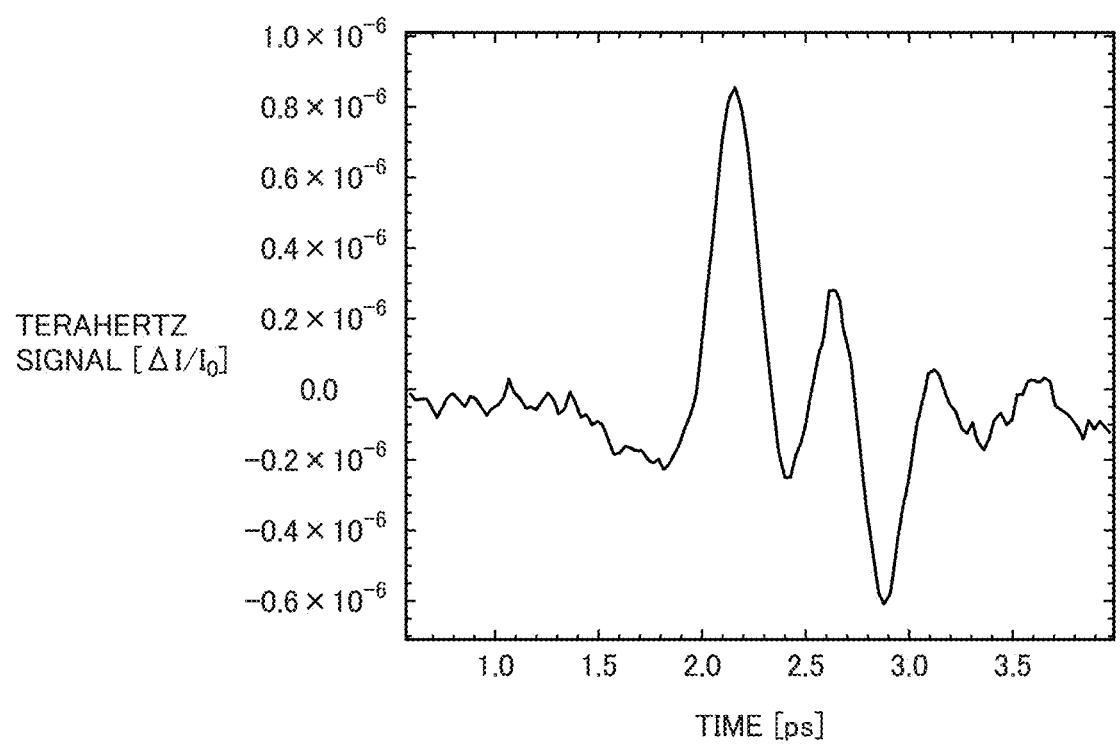
FIG. 11 is a graph showing the time waveform of a terahertz wave generated from a waveguide element for terahertz wave according to Examples.

Sample A and sample C (thickness: 1 mm) were prepared in the same manner as in Example 1. By subjecting sample A and sample C to pressure bonding at 100° C. so that the processed surfaces faced each other, an electro-optic polymer layer was transferred and laminated onto a cycloolefin polymer supporting body. The surface of the electro-optic polymer layer of the obtained sample was subjected to oxygen plasma processing using a reactive ion etching apparatus in the same manner as in the preparation of sample A (hereinafter, may be referred to as "sample F"). By subjecting sample F and another new sample C (thickness: 1 mm) to pressure bonding at 100° C. so that the processed surfaces faced each other, both the samples were joined. Thus, a laminate corresponding to FIG. 3(b) was prepared. A scanning electron microscope image of the cross section of the laminate is shown in FIG. 10. The thickness of the electro-optic polymer layer in the prepared laminate was 4.5 μm, and the electro-optic constant ($r_{33}$) at a wavelength of 1550 nm was 45 pm/V. Using two cylindrical lenses (focal length f=100 mm and f=12 mm) disposed so as to be orthogonal to each other, a terahertz wave was generated by irradiating a laminate having a device length of 1.0 mm with a 20 mW femtosecond pulse laser (center wavelength: 1.56 μm, pulse width: 100 fs or less, repetition frequency: 50 MHz). The terahertz wave was detected by an electro-optic sampling method using probe light having a wavelength of 780 nm and zinc telluride having a thickness of 1 mm. That is, the probe light was superimposed on the terahertz wave in a zinc telluride crystal, and the polarization state of the probe light was changed by a Pockels effect induced by a terahertz electric field. The probe light having a changed polarization state was separated into two types of polarization components (longitudinally polarized light and laterally polarized light) after passing through a λ/4 plate and a polarizing prism. The separated polarization components were detected by two detectors of a balance detector. The total power of the probe light input to the two detectors in the balance photodetector was 60 µW. FIG. 11 shows a time waveform of a terahertz wave obtained by an electro-optic sampling method. The ratio ($\Delta I/I_0$) of the change amount of probe light intensity to the total light intensity of the probe light is proportional to the terahertz electric field. From the results of FIG. 11, the generation of the terahertz wave from the laminate was confirmed.

Example 4 (Preparation of Free-Standing Electro-Optic Polymer Laminate)

An electro-optic polymer laminate (free-standing electro-optic polymer laminate) was prepared, in which a supporting body was an electro-optic polymer layer subjected to poling processing. FIG. 12 shows an example of a process for preparing an electro-optic polymer laminate when a supporting body is an electro-optic polymer layer subjected to poling processing. In the present Example 4, first, by the same method as that in Example 1, an electro-optic polymer layer was formed on an ITO electrode. An IZO electrode was formed on the electro-optic polymer layer, and subjected to poling processing, followed by removing the IZO electrode. By separating only the electro-optic polymer layer from the obtained sample having a surface having the electro-optic polymer layer subjected to poling processing, a first electro-optic polymer layer (thickness: 2.8 µm) subjected to poling processing and a second electro-optic polymer layer (thickness: 3.1 µm) subjected to poling processing were prepared. Next, the surfaces of the first electro-optic polymer layer and the second electro-optic polymer layer were subjected to oxygen plasma processing by the same method as that in Example 1. Thereafter, by subjecting the first electro-optic polymer layer and the second electro-optic polymer layer to pressure bonding at 100° C. so that the processed surfaces faced each other, the first electro-optic polymer layer and the second electro-optic polymer layer were laminated. Through the above steps, the free-standing electro-optic polymer laminate (hereinafter, may be referred to as "laminate") was prepared.

Figure 13:
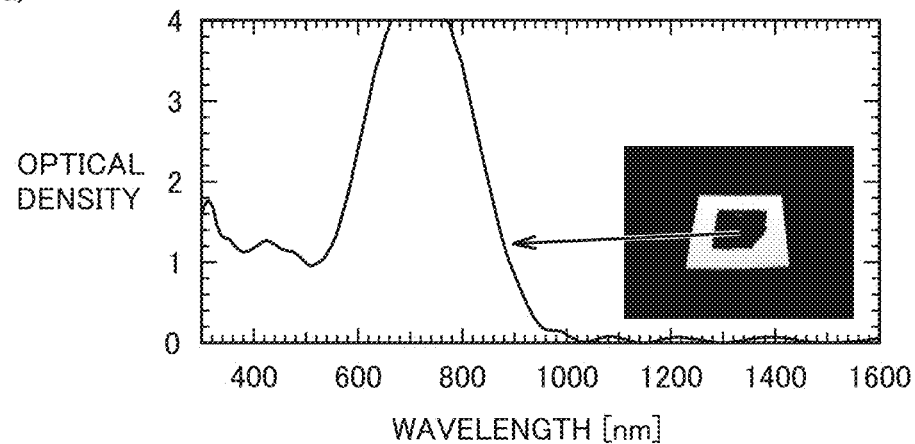
FIG. 13 is a graph showing the absorbance spectra of an electro-optic polymer layer and a free-standing electro-optic polymer laminate according to Examples.
Figure 13:
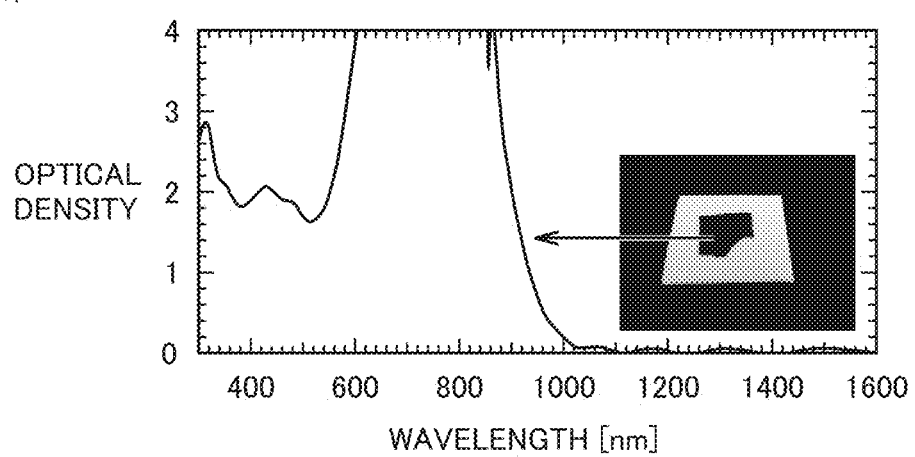
Figure 13:
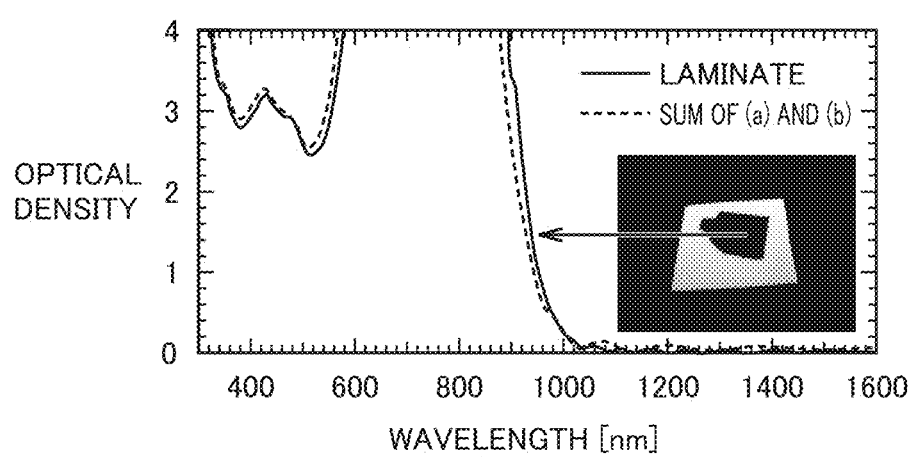
Figure 14:
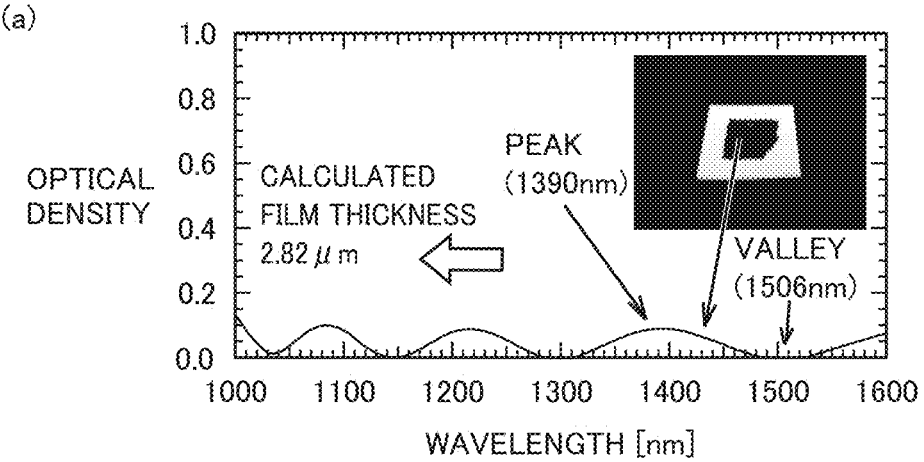
FIG. 14 is a graph showing the thin film interference spectra of an electro-optic polymer layer and a free-standing electro-optic polymer laminate according to Examples.
Figure 14:
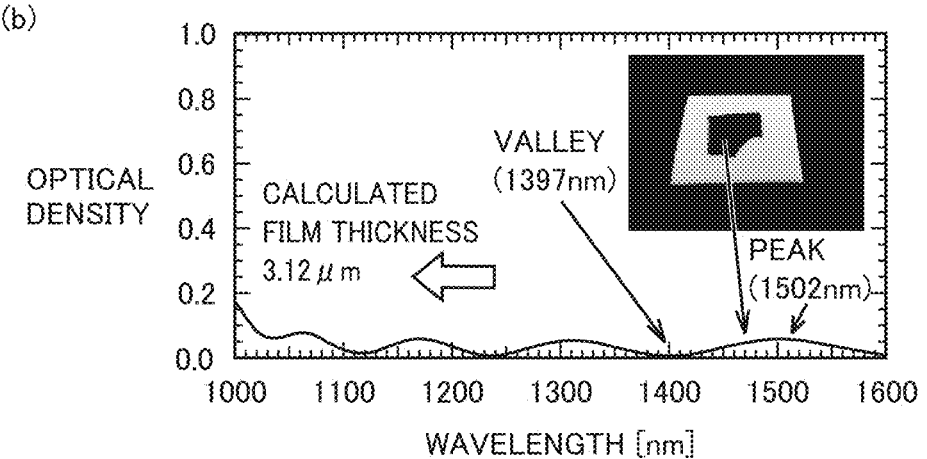
Figure 14:
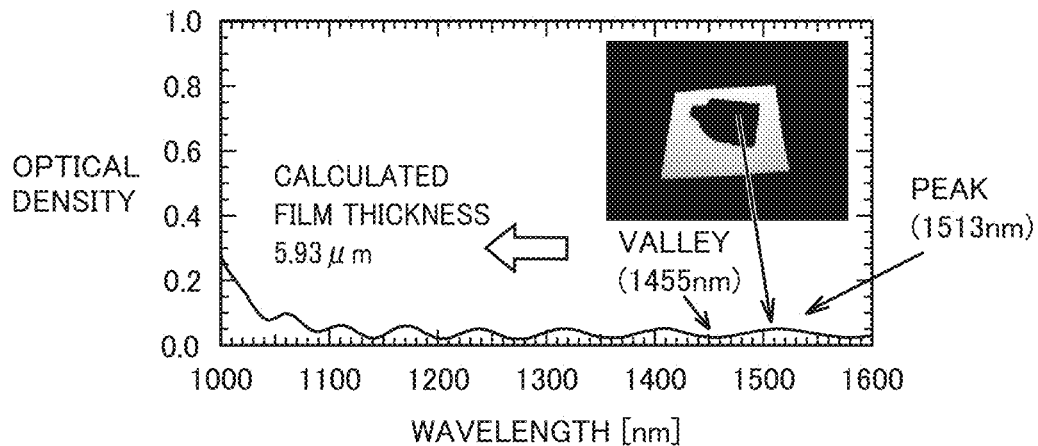

FIG. 13 shows absorbance spectra of (a) a first electro-optic polymer layer subjected to poling processing (2.8 µm) (supporting body), (b) a second electro-optic polymer layer subjected to poling processing prior to lamination (3.1 µm), and (c) the laminate. These absorbance spectra were measured in a state where the electro-optic polymer layer or the laminate was electrostatically adsorbed on a glass substrate with an air layer sandwiched therebetween. According to the Lambert-Beer's law, the absorbance spectrum of the laminate is the sum of the absorbance spectra of the first electro-optic polymer layer subjected to poling processing and the second electro-optic polymer layer subjected to poling processing. As shown in FIG. 13(c), the absorbance spectrum of the laminate is almost equal to the sum of the absorbance spectra of the first electro-optic polymer layer subjected to poling processing and the second electro-optic polymer layer subjected to poling processing. FIG. 14 shows thin film interference spectra (interference spectra due to thin film interference) of (a) a first electro-optic polymer layer subjected to poling processing (2.8 µm) (supporting body), (b) a second electro-optic polymer layer subjected to poling processing prior to lamination (3.1 µm), and (c) the laminate (5.9 µm). A wavelength band in a range of 1000 nm to 1600 nm is hardly absorbed by the electro-optic polymer layer. In the wavelength band, the thin film interference spectrum of each of the first electro-optic polymer layer subjected to poling processing, the second electro-optic polymer layer subjected to poling processing prior to lamination, and the laminate was observed. The generation of the thin film interference spectrum means the presence of a homogeneous and independent thin film (free standing thin film) having a certain thickness from the optical viewpoint.

When a homogeneous thin film having a thickness d and a refractive index n is present, reflection and transmission respectively occur on the upper and lower surfaces of the thin film. Light having a wavelength λ, incident from the lower surface side and first reflected by the lower surface of the thin film is taken as reflected light 1. Light incident from the lower surface side, passing through the lower surface of the thin film, reflected by the upper surface of the thin film, and passing through the lower surface of the thin film is taken as reflected light 2. The condition that reflected light 1 and reflected light 2 are intensified is 2nd=mλ. The condition that reflected light 1 and reflected light 2 are weakened is 2nd=(m±1/2)λ. m is a natural number. In the absorbance spectrum measured by changing the wavelength λ, a peak of the spectrum is observed under the condition that the reflected lights are intensified, and a valley of the spectrum is observed under the condition that the reflected lights are weakened. Such an absorbance spectrum is referred to as thin film interference spectrum.

In the thin film interference spectrum, the thickness d of the thin film can be calculated from the wavelengths of the peak and valley of the interference spectrum, the wavelengths of the peaks or the wavelengths of the valleys, and the refractive index n of the thin film. In the thin film interference spectrum, the relationship among the wavelengths of the adjacent peak and valley ($\lambda_1, \lambda_2$), the thickness d, and the refractive index n is $d=|1/(4n(1/\lambda_2-1/\lambda_1))|$. The refractive index of the electro-optic polymer layer used is 1.6 at a wavelength of 1550 nm. Using the wavelengths of the adjacent peak and valley near 1550 nm in the thin film interference spectrum ($\lambda_1, \lambda_2$ respectively), the first electro-optic polymer layer, the second electro-optic polymer layer, and the layer thickness (film thickness) of the laminate were calculated. The refractive index was assumed to be 1.6 at the wavelengths of the adjacent peak and valley. The wavelengths of the peak and valley in the thin film interference spectrum of the first electro-optic polymer layer were $\lambda_1$=1390 nm and $\lambda_2$=1506 nm. The calculated thickness was d=2.82 µm. The wavelengths of the peak and valley in the thin film interference spectrum of the second electro-optic polymer layer were $\lambda_1$=1502 nm and $\lambda_2$=1397 nm. The calculated thickness was d=3.12 µm. The wavelengths of the peak and valley in the thin film interference spectrum of the laminate were $\lambda_1$=1513 nm and $\lambda_2$=1455 nm. The calculated thickness was d=5.93 µm. Thus, the layer thicknesses were confirmed to coincide with each other. The layer thickness of the laminate coincides with the sum of the layer thicknesses of the first electro-optic polymer layer subjected to poling processing and second electro-optic polymer layer subjected to poling processing. The homogeneous and independent laminate (free-standing electro-optic polymer laminate) having a predetermined thickness from the optical viewpoint was confirmed to be formed.

Example 5 (Preparation of Light Modulation Element Using Ultraviolet Curable Resin as Supporting Body)

A sample having a surface having an electro-optic polymer layer formed thereon was prepared in the same manner as in sample A of Example 1 (hereinafter, the obtained sample may be referred to as "sample G"). The glass transition temperature of the electro-optic polymer used for the preparation of sample G was 178° C.; the temperature of poling processing was 165° C.; and the electric field during poling was 120 V/μm. The electro-optic polymer constant ($r_{33}$) of the measured electro-optic polymer layer was 60 pm/V at a wavelength of 1308 nm and 42 pm/V at a wavelength of 1550 nm. An IZO lower electrode of an optical modulator was formed on a silicon substrate with a thermal oxide film having a thickness of 2 μm by a sputtering method. On the IZO lower electrode, an ultraviolet curable resin (FE4048, manufactured by NTT-AT) as a supporting body was applied by a spin coating method, irradiated with 365 nm LED light, and then heated at 100° C. for 2 hours. The surface of the supporting body of the ultraviolet curable resin was subjected to oxygen plasma processing using a reactive ion etching apparatus and processed by a silane coupling agent having an amino group (hereinafter, the obtained sample may be referred to as "sample H"). Sample G and sample H were subjected to pressure bonding at 100° C. so that the processed surfaces faced each other, thereby transferring and laminating the electro-optic polymer layer onto the supporting body of the ultraviolet curable resin.

Figure 15:
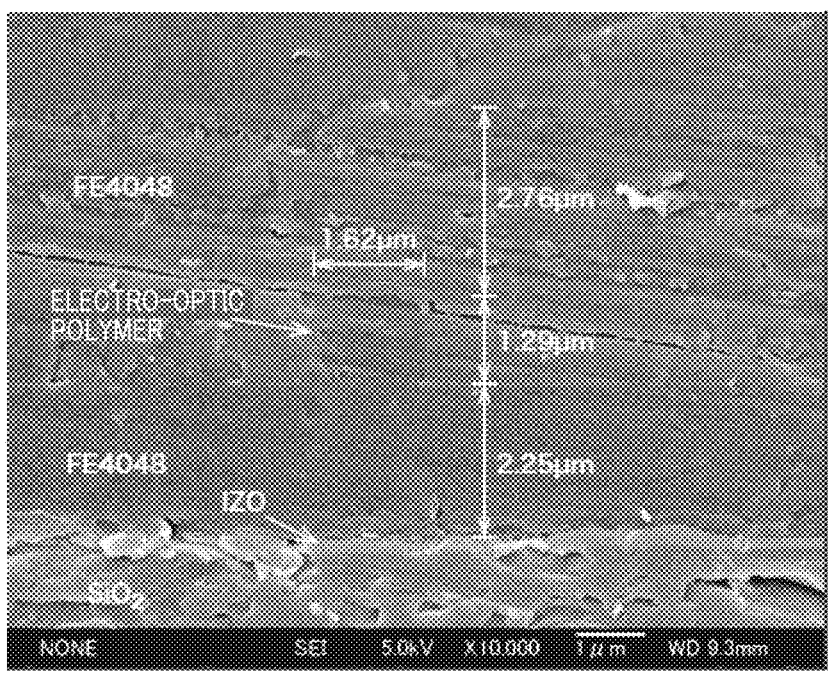
FIG. 15 is a scanning electron microscope image in the cross section of a light modulation element according to Examples.
Figure 16:
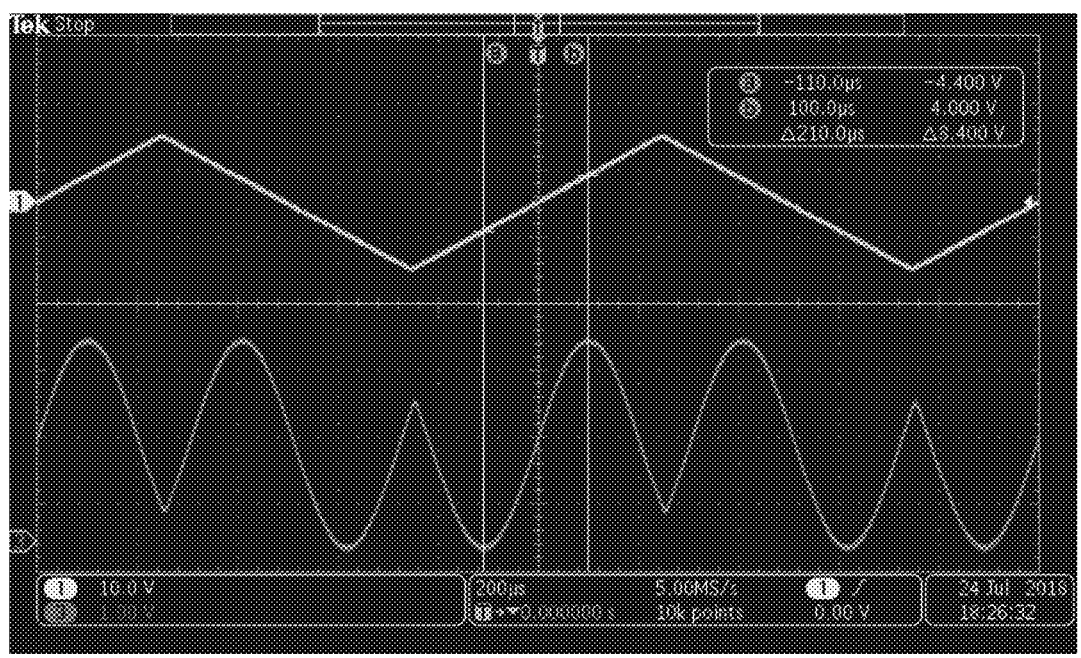
FIG. 16 is a graph showing the time waveform of light modulation in a light modulation element according to Examples.

Thereafter, a mask was formed on the electro-optic polymer layer by photolithography, and the electro-optic polymer layer was processed into a rectangular structure (1.62 μm×1.29 μm) by a dry etching method using a reactive ion etching apparatus. The optical waveguide forms a Mach-Zehnder (MZ) type optical modulator structure. On the processed electro-optic polymer layer, an ultraviolet curable resin (FE4048, manufactured by NTT-AT) was applied as an upper clad layer of an optical waveguide by a spin coating method, irradiated with 365 nm LED light, and then heated at 80° C. for 2 hours. An IZO upper electrode of an optical modulator was formed on the upper clad layer by a sputtering method. With the above procedure, a light modulation element having a structure corresponding to FIG. 5 was prepared. FIG. 15 is a cross-sectional image of a light incident part of the prepared light modulation element. In FIG. 15, a channel type electro-optic polymer waveguide structure can be confirmed on an ultraviolet curable resin supporting body. FIG. 16 shows the time waveform of light modulation. In FIG. 16, a channel 1 represents an applied voltage, and a channel 3 represents the output light intensity of an MZ light modulator. The light output waveform of a typical MZ light modulator with respect to the voltage change of a triangular waveform was shown, and a π phase modulation voltage (voltage between the minimum value and the maximum value) was 8.4 V.

Thus, while embodiments and Examples of the present invention have been described, it is also initially planned to combine configurations of the embodiments and Examples, as appropriate.

It should be understood that the embodiment and Examples disclosed herein are illustrative and non-restrictive in all respects. The scope of the present invention is defined by the claims, rather than the embodiments and Examples above, and is intended to include any modifications within the meaning and scope equivalent to the claims.

REFERENCE SIGNS LIST 1, 4 substrate; 2 lower electrode; 3 upper electrode; 5 metal layer; 6 high refractive index material layer; 7 light modulation electrode; 10 electro-optic polymer layer; 11 electro-optic polymer layer subjected to poling processing; 12, 13 waveguide obtained by processing electro-optic polymer layer subjected to poling processing; 14 slab waveguide obtained by processing electro-optic polymer layer subjected to poling processing; 20, 23, 26 supporting body; 21 terahertz wave low absorption loss material layer; 22 high refractive index material layer; 25 upper clad layer; 50 laminate for non-linear optics

The invention claimed is:

1. A method for producing a laminate for non-linear optics, the method comprising:
a step of subjecting an electro-optic polymer layer containing an electro-optic molecule to poling processing;
a step of laminating the electro-optic polymer layer subjected to the poling processing on a supporting body, and
wherein the step of laminating includes transferring the electro-optic polymer layer subjecting to the poling processing onto the supporting body.

2. The method according to claim 1, wherein the step of laminating is performed by bonding a surface of the electro-optic polymer layer and a surface of the supporting body through a covalent bond, an electrostatic interaction, or a van der Waals interaction.

3. The method according to claim 1, further comprising subjecting a second electro-optic polymer layer containing an electro-optic molecule to poling processing and laminating the second electro-optic polymer layer subjected to poling processing onto the electro-optic polymer layer containing an electro-optic molecule subjected to poling processing.

4. The method according to claim 1, wherein a surface of the electro-optic polymer layer is subjected to oxygen plasma processing to activate the surface prior to transferring the electro-optic polymer layer subjected to poling processing onto the supporting body.

5. The method according to claim 1, wherein the surface of the supporting body is subjected to oxygen plasma prior to transferring the electro-optic polymer layer subjected to poling processing onto the supporting body.

6. The method according to claim 5, wherein the surface of the supporting body is processed by a silane coupling agent prior to transferring the electro-optic polymer layer subjected to poling processing onto the supporting body.

7. The method according to claim 6, wherein the silane coupling agent has an amino group, a vinyl group, an epoxy group, a styryl group, a methacryl group, an acryl group, an isocyanate group, an isocyanurate group, a ureido group, or a mercapto group.

8. The method according to claim 1, wherein the step of laminating includes pressure bonding the electro-optic polymer layer and the supporting body while heating the electro-optic polymer layer and the supporting body.

9. The method according to claim 1, wherein the supporting body contains at least one selected from the group consisting of glass, silicon dioxide, quartz glass, a fluororesin, polycarbonate, poly[bisphenol A carbonate-co-4,4'-(3,3,5-trimethylcyclohex ylidene) diphenol carbonate], a (meth)acrylate polymer, polymethyl methacrylate (PMMA), poly dicyclopentanyl methacrylate (poly DCPMA), polyadamantyl methacrylate (poly AdMA), poly(DCPMA-co-MMA), poly(AdMA-co-MMA), a cycloolefin polymer, a cycloolefin copolymer, polystyrene, polyethylene, polymethylpentene, polypropylene, polyimide, polyvinyl alcohol (PVA), polyethylene terephthalate, an ultraviolet curable resin, diamond, aluminum oxide, hafnium oxide, zirconium dioxide, silicon nitride, aluminum nitride, lithium niobate, lithium tantalate, sol-gel glass, electro-optic polymers, poly(Disperse Red 1 acrylate), poly(Disperse Red 1 methacrylate), poly(Disperse Red 13 acrylate), poly(Disperse Red 13 methacrylate), poly(Disperse Orange 3 acrylamide), poly(Disperse Orange 3 methacrylamide), poly(Disperse Yellow 7 acrylate), poly(Disperse Yellow 7 methacrylate), silicon, boron-doped silicon, phosphorus-doped silicon, silicon carbide, silicon germanium, germanium, gallium arsenide, indium phosphide, gallium nitride, gallium phosphide, zinc selenide, cadmium sulfide, cadmium selenide, telluride cadmium, zinc sulfide, zinc selenide, zinc telluride, cadmium zinc telluride, titanium oxide, lanthanum oxide, yttrium oxide, tantalum pentoxide, zinc oxide, gallium oxide, magnesium oxide, hafnium silicate, carbon nitride, titanium nitride, hafnium nitride, silicon oxynitride, aluminum oxynitride, hafnium oxynitride, lanthanum-doped lead zirconate titanate, gold, silver, copper, platinum, aluminum, ITO, IZO, fluorine-doped tin oxide, InGaZnO, aluminum-doped zinc oxide, gallium-doped zinc oxide, and $SnO_2$.

10. A laminate for non-linear optics comprising:
a supporting body; and
an electro-optic polymer layer laminated on the supporting body with being in contact with the supporting body,
wherein
the electro-optic polymer layer contains an electro-optic molecule, and
the electro-optic molecule in the electro-optic polymer layer is oriented in a predetermined direction.

11. The laminate for non-linear optics according to claim 10, wherein an adhesive strength between the supporting body and the electro-optic polymer layer is greater than or equal to 0.01 N/mm² and less than or equal to 20 N/mm².

12. The laminate for non-linear optics according to claim 10, wherein the supporting body has an electrical resistivity larger than $10^8$ Ω·m.

13. The laminate for non-linear optics according to claim 10, wherein the supporting body contains at least one selected from the group consisting of glass, silicon dioxide, quartz glass, a fluororesin, polycarbonate, poly[Bisphenol A carbonate-co-4,4'-(3,3,5-trimethylcyclohexylidene) diphenol carbonate], a (meth)acrylate polymer, polymethyl methacrylate (PMMA), polydicyclopentanyl methacrylate (poly DCPMA), polyadamantyl methacrylate (poly AdMA), poly(DCPMA-co-MMA), poly(AdMA-co-MMA), a cycloolefin polymer, a cycloolefin copolymer, polystyrene, polyethylene, polymethylpentene, polypropylene, polyimide, polyvinyl alcohol (PVA), polyethylene terephthalate, an ultraviolet curable resin, diamond, aluminum oxide, hafnium oxide, zirconium dioxide, silicon nitride, aluminum nitride, lithium niobate, and lithium tantalate.

14. The laminate for non-linear optics according to claim 10, wherein an interface between the supporting body and the electro-optic polymer layer includes a silane coupling agent and/or at least one group selected from the group consisting of a hydroxy group, an organic group containing a carbonyl group, an aldehyde group, and a carboxyl group.

15. The laminate for non-linear optics according to claim 14, wherein the silane coupling agent has an amino group, a vinyl group, an epoxy group, a styryl group, a methacryl group, an acryl group, an isocyanate group, an isocyanurate group, a ureido group, or a mercapto group.

16. A waveguide element for terahertz wave, comprising the laminate for non-linear optics according to claim 10, wherein the supporting body contains a cycloolefin polymer or a cycloolefin copolymer.

17. A non-linear optical element for high-power laser, comprising the laminate for non-linear optics according to claim 10, wherein the electro-optic polymer layer has a thickness of greater than or equal to 5 μm and less than or equal to 50 cm.

18. A light modulation element comprising the laminate for non-linear optics according to claim 10, wherein the supporting body contains at least one selected from the group consisting of glass, $SiO_2$, a fluororesin, polycarbonate, a (meth)acrylate polymer, a cycloolefin polymer, a cycloolefin copolymer, polystyrene, polyethylene, polymethylpentene, polypropylene, polyimide, polyvinyl alcohol, polyethylene terephthalate, an ultraviolet curable resin, aluminum oxide, silicon nitride, and aluminum nitride.

19. A free-standing electro-optic polymer laminate comprising the laminate for non-linear optics according to claim 10, wherein the supporting body is an electro-optic polymer having same composition as or different composition from composition of the electro-optic polymer layer.

20. A method for producing a laminate for non-linear optics, the method comprising:
a step of subjecting an electro-optic polymer layer containing an electro-optic molecule to poling processing;
a step of laminating the electro-optic polymer layer subjected to the poling processing on a supporting body, and
wherein the step of laminating the electro-optic polymer layer subjected to the poling processing on the supporting body comprises continuously passing a film of the electro-optic polymer layer subjected to the poling processing and a film of the supporting body between a pair of pasting rolls.

* * * * *